United States Patent
Ding et al.

(10) Patent No.: US 8,538,081 B2
(45) Date of Patent: Sep. 17, 2013

(54) CONTEXTUAL BOOST FOR OBJECT DETECTION

(75) Inventors: Yuanyuan Ding, Santa Clara, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 88 days.

(21) Appl. No.: 13/371,847

(22) Filed: Feb. 13, 2012

(65) Prior Publication Data

US 2012/0219211 A1    Aug. 30, 2012

Related U.S. Application Data

(60) Provisional application No. 61/447,570, filed on Feb. 28, 2011.

(51) Int. Cl.
*G06K 9/00* (2006.01)

(52) U.S. Cl.
USPC ............................. 382/103; 382/224

(58) Field of Classification Search
None
See application file for complete search history.

(56) References Cited

U.S. PATENT DOCUMENTS

| | | | |
|---|---|---|---|
| 7,689,033 B2 | 3/2010 | Xiao et al. | |
| 7,764,808 B2 | 7/2010 | Zhu et al. | |
| 7,773,254 B2 * | 8/2010 | Nagarajan et al. | 358/1.9 |
| 7,822,696 B2 | 10/2010 | Zhang et al. | |
| 7,835,541 B2 | 11/2010 | Lee et al. | |
| 7,844,085 B2 * | 11/2010 | Lu et al. | 382/118 |
| 8,015,132 B2 * | 9/2011 | Xu | 706/20 |
| 8,396,286 B1 * | 3/2013 | Aradhye et al. | 382/159 |
| 8,406,483 B2 * | 3/2013 | Zhang et al. | 382/118 |
| 8,452,778 B1 * | 5/2013 | Song et al. | 707/748 |
| 2006/0062451 A1 * | 3/2006 | Li et al. | 382/159 |
| 2008/0008362 A1 | 1/2008 | Hu | |
| 2008/0123968 A1 | 5/2008 | Nevatia et al. | |
| 2008/0304714 A1 * | 12/2008 | Lu et al. | 382/118 |
| 2010/0008540 A1 | 1/2010 | Shet et al. | |
| 2012/0128237 A1 * | 5/2012 | Wang et al. | 382/159 |

OTHER PUBLICATIONS

Ryuei Nishii. "Contextual Image Classification Based on Spatial Boosting" IEEE, 0-7803-9510-7/06. 2006.*
Zhu, Q., et al., "Fast Human Detection Using a Cascade of Histograms of Oriented Gradients", IEEE Computer Society Conference, Computer Vision and Pattern Recognition, 2006.
Viola, P., et al., "Rapid Object Detection Using a Boosted Cascade of Simple Features", Accepted Conference on Computer Vision and Pattern Recognition, 2001.
Perko, R., et al., "Integrating Visual Context and Object Detection within a Probabilistic Framework", WAPCV 2008, LNAI 5395, pp. 54-68, 2009 Springer-Verlag Berlin Heidelberg 2009.
Szczot, M., et al., "Incorporating Contextual Information in Pedestrian Recognition", Intelligent Vehicles Symposium, Jun. 2009 IEEE.
Paisitkriangkrai, S., et al., "Fast Pedestrian Detection Using a Cascade of Boosted Covariance Features", IEEE Transactions on Circuits and Systems for Video Technology, vol. 18, No. 8, Aug. 2008.
Viola, P., et al., "Detecting Pedestrians Using Patterns of Motion and Appearance", Proceedings of the Ninth IEEE International Conference on Computer Vision (ICCV 2003) 2-Volume Set, IEEE Computer Society.
Perko, R., et al., "Context Awareness for Object Detection", Computer and Information Science, vol. 0214, Publisher: Citeseer 2007.

* cited by examiner

*Primary Examiner* — Barry Drennan
*Assistant Examiner* — Oneal R Mistry

(57) ABSTRACT

Aspects of the present invention includes systems and methods for generating detection models that consider contextual information of an image patch and for using detection models that consider contextual information. In embodiments, a multi-scale image context descriptor is generated to represent the contextual cues in multiple parameters, such as spatial, scaling, and color spaces. In embodiments, a classification context is defined using the contextual features and is used in a contextual boost classification scheme. In embodiments, the contextual boost propagates contextual cues to larger coverage through iterations to improve the detection accuracy.

20 Claims, 17 Drawing Sheets

500

800
**High-resolution
Feature Generation**
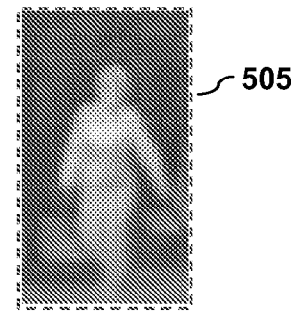
← 505
↓
Resize (if needed) to a normalized
high-resolution size (e.g., 64 x 128
pixels)
(805)
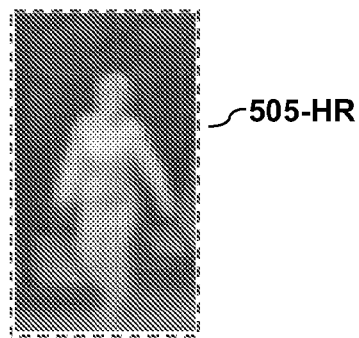
← 505-HR
↓
Compute high-resolution feature for
the normalized image patch (e.g.,
histogram of gradient (HoG) feature)
(810)
↓
High-
Resolution
Feature Set
815
FIGURE 8

1000
**Low-resolution
Feature Generation**

Resize (if needed) the combined image
patch and context region to a normalized
low-resolution size (e.g., 32 x 64 pixels)
(1005)

Low-
Resolution
Feature Set
1015

Compute low-resolution feature for the
normalized image patch (e.g., histogram
of gradient (HoG) feature)
(1010)

CONTEXTUAL BOOST FOR OBJECT DETECTION

CROSS-REFERENCE TO RELATED APPLICATION

This application claims the priority benefit under 35 USC §119(e) to commonly assigned and co-pending U.S. Patent Application No. 61/447,570, filed on Feb. 28, 2011, entitled "CONTEXTUAL BOOST FOR PEDESTRIAN DETECTION," and listing as inventors Yuanyuan Ding and Jing Xiao. The aforementioned patent document is incorporated by reference herein in its entirety.

This application is related to commonly assigned and co-pending U.S. patent application Ser. No. 13/198,382, filed on Aug. 4, 2011, entitled "LOCAL DIFFERENCE PATTERN BASED LOCAL BACKGROUND MODELING FOR OBJECT DETECTION," and listing as inventors Yuanyuan Ding and Jing Xiao. The aforementioned patent document is incorporated by reference herein in its entirety.

This application is related to commonly assigned and co-pending U.S. patent application Ser. No. 13/350,375, filed on Jan. 13, 2012, entitled "MULTI-SCALE, PERSPECTIVE CONTEXT, AND CASCADE FEATURES FOR OBJECT DETECTION," and listing as inventors Yuanyuan Ding and Jing Xiao. The aforementioned patent document is incorporated by reference herein in its entirety.

BACKGROUND

1. Field of Invention

The present patent document is directed towards systems and methods for object detection. More particularly, the present patent document is directed towards systems and methods for generating and using object detection models that include contextual information.

2. Description of the Related Art

Object detection from images can be important to many applications, such as surveillance, robotics, manufacturing, security, medicine, and automotive safety—just to name a few areas of application. However, object detection is among the most challenging vision tasks due in part to the great variety in appearance and shape of objects, highly cluttered environments, and often low resolution and low quality image sources.

Predominant approaches for object detection usually involve scanning an input image with sliding windows to identify the locations of image patches that may contain the object of interest. To determine whether a local window includes the object of interest, both generative and discriminative approaches have been developed. The generative approaches typically infer the posterior probability for the object class using discrete or continuous shape models, or combining shape and texture models. The discriminative approaches extract image features in the local window and construct classifiers for detection. For this purpose, various features have been proposed, such as Haar wavelet features, gradient-based features, shape-based features, combination of multiple features, automatically mined features, or pose-invariant features. The local features are then used to identify the object of interest in a classification process by algorithms such as AdaBoost or support vector machine (SVM).

It must be noted, however, that these methods generally only utilize information inside an image patch region. That is, these detection methods seek to detect the object without taking into account the context. Furthermore, these prior approaches do not adequately consider that objects at different sizes have qualitatively very different appearances.

Accordingly, systems and methods are needed that can address the challenges presented when trying to detect an object or item in an image.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the scope of the invention to these particular embodiments.

FIG. 8 presents a method for forming a high-resolution, or high-scale, feature according to embodiments of the present invention.

DESCRIPTION OF THE PREFERRED EMBODIMENTS

Figure 1:
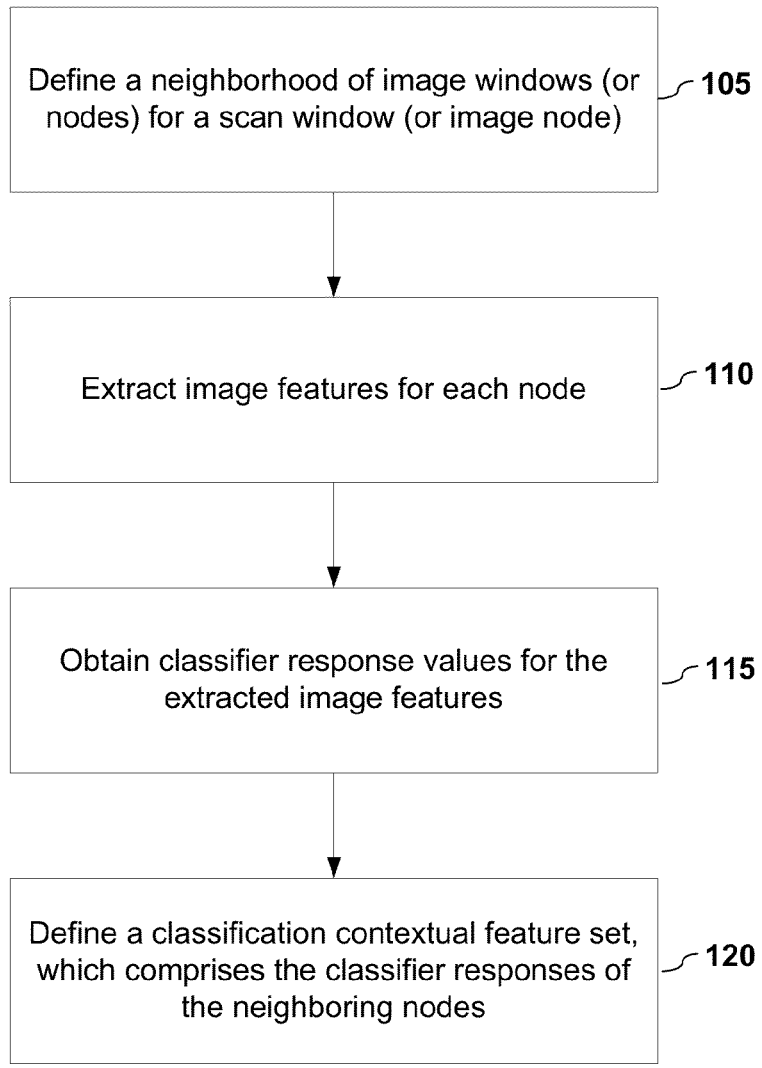
FIG. 1 depicts a method for generating a classification context feature set according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or combinations thereof. Accordingly, the figures described herein are illustrative of specific embodiments of the invention and are meant to avoid obscuring the invention.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments. It shall be noted that the use of the term "set" in this patent document shall include one or more items.

Background

Prior methods for detecting objects within an image using classifiers have typically been limited because the methods focused on detecting the object but did not adequately account for background variations and contextual information. As a result, the classifiers were effective for certain situations but were less effective for others.

Background variation can be a significant issue because input images are often captured under different conditions, such as different levels of exposure, different ISO settings, different backgrounds, and the like. This is especially apparent when dealing with thermal infrared (IR) images. Infrared images are often used to identify humans because the images are more robust. Infrared images eliminate variations due to clothes, colors, etc. However, one issue with infrared images is that changes in ambient temperature, which can vary significantly within a day and between days, directly affect the background of the IR images. Moreover, the temperature can vary from below normal body temperature to above normal body temperature. Thus, if the camera is set with "auto-exposure," when the background temperature is lower than body temperature, the human figure will be bright and the background dark. When the background temperature is higher than body temperature, the image contrast will be reversed with the human figure being dark and the background light. Finally, when the background temperature is close to normal body temperature, the human figure and background intensities will differ very little, making it more difficult to detect the human images.

Accordingly, modeling systems and methods can be improved by accounting for variations in background. Thus, embodiments in the present document use background information to differentiate input images into different classes using a local different pattern (LDP) feature. In embodiments, the local different pattern may be used both in training detection systems and in detection systems.

Furthermore, when attempting to detect an object in an image, it is important to consider factors that aid in improving the ability to detect the object. Both the scale of an object of interest and its contextual information are significant factors to consider in object detection. Traditionally, like objects were treated or modeled in a like manner. While such approaches seem logical, they fail to consider that objects at different sizes can have qualitatively very different appearances. Thus, systems and methods of object detection can have better detection rates by modeling or representing like objects of different size or resolution differently. Furthermore, context information, such as pixel location, object height, width, etc., also provides important features that can aid object detection.

There have also been a number of prior attempts to use context cues. For example, context cues have been used in a number of computer vision tasks such as segmentation, tracking, and object recognition. Some prior methods trained Adaboost classifiers on the pixels of the object and the background to segment the image pixels. Other methods proposed contextual flow to constrain motion estimation for target tracking, where the spatial context of a pixel is represented by the posterior density of the associated feature class. Such constraints on spatial context allegedly improve robustness. Another method used word-to-region mapping learned from spatial relationships between image objects and their tags to attempt to improve the accuracy of segmentation and object recognition. Boosted random field has been proposed to learn the graph structure and local evidence of a conditional random field for object detection and segmentation. Others have suggested that context might be determined from low-level visual features sampled over a wide receptive field. A feed-forward context feature is then proposed to construct a discriminative object detector.

The notion of context has also attracted interests in pedestrian detection. One method proposes using normalized HOG features for human detection. To achieve better accuracy, the local window may be slightly enlarged to include neighboring pixels around the human figure when computing the HOG features. Other cues such as shape and scale have also been suggested to be incorporated as feature descriptors to improve the detection performance. A latent SVM classifier constructed using discriminatively trained deformable part models has also been proposed for object detection. Scale-variant part models that allegedly act as deformable at large scales and rigid at small scales have also been suggested. Others have proposed augmenting edge-based features with cues such as color and texture to obtain descriptors. Furthermore, it has been proposed to use a set of component-based expert classifiers that are developed by combining multiple cues including intensity, depth, and motion to handle partial occlusion. Additional methods include spatialboost and auto-context and their extensions. These methods integrate classifier responses from nearby background pixels to help determine the target pixels of interest. These works have been applied in attempts to solve problems such as image segmentation and body-pose estimation.

The systems and methods of the current patent document address the problem of object detection, such as pedestrian detection, and present contextual boost frameworks that provide ways to incorporate context cues from neighborhood regions. The systems and methods presented herein differ significantly from the prior approaches in terms of, at least, both feature descriptors and classification methodologies. First, in embodiments, multi-scale, or multi-parameter, image context feature or features combine the local window with neighboring windows to represent multiple elements, such as (by way of example and not limitation) spatial, scaling, temporal, and color context, and is not simply enlarging the local window. As previously noted, prior methods for detecting objects within an image using classifiers were limited because these methods did not adequately consider contextual information. Aspects of the present patent document include embodiments which comprise contextual feature descriptors to improve object detection, such (by way of example and not limitation) human detection. In embodiments, multi-resolution feature descriptors, context feature descriptors, and combinations thereof may be used in training detection systems and in detection systems.

Second, in embodiments, contextual boost classification iteratively uses the classifier responses based on the contextual features as additional classification context cues to further constrain the detection process. The classification context features incorporate cues from the neighborhood windows across multiple scales/parameters, and thus implicitly propagate to greater context and provide more global constraints through iterations.

Furthermore, in embodiments, the systems and methods allow easy incorporation of other successful sliding-window detectors. Experiments on benchmark databases have confirmed the effectiveness of embodiments of the contextual boost systems and methods.

Detection of humans may be used herein for purposes of illustration, but it shall not limit application of the present inventions; one skilled in the art shall recognize that the teachings of the present patent document may be used or adapted for use in detecting other objects of interest.

Classification Context

Aspects of the present inventions include using classifier responses in a neighborhood or neighborhoods across multiple parameters to provide useful context cue for object detection for an image patch, or scan window. The inventors noticed that classifier responses using image context features tend to yield positive responses clustered densely around objects of interest, such as humans, but occur sparsely in the background. For response values using different scan window sizes, it was again seen that the value was generally high around the object and low in the background. Furthermore, it was noticed that this was typical across image samples.

These observations inspired that the classifier responses in the neighborhood across multiple factors may provide useful context cues for object detection. To incorporate such low-level context cues, embodiments of the systems and methods disclosed herein incorporate one or more multi-scale/multi-parametric image context features by combining information of a local scan window with neighborhood windows. In embodiments, it may be constructed by incorporating the features on different combinations of neighborhood windows at multiple scales, so that contextual constraints, such as (by way of example and not limitation) spatial, scale, and color spaces, are represented. It shall be noted that embodiments of the image context feature are significantly different from other methods where the context is represented by simply enlarging scan windows.

FIG. 1 depicts a method for generating a classification context feature set according to embodiments of the present invention. As illustrated in FIG. 1, the depicted method commences by defining (105) a neighborhood of image windows for a scan window. In embodiments, a classification context may be defined multi-dimensionally, or multi-parametrically.

Figure 2:
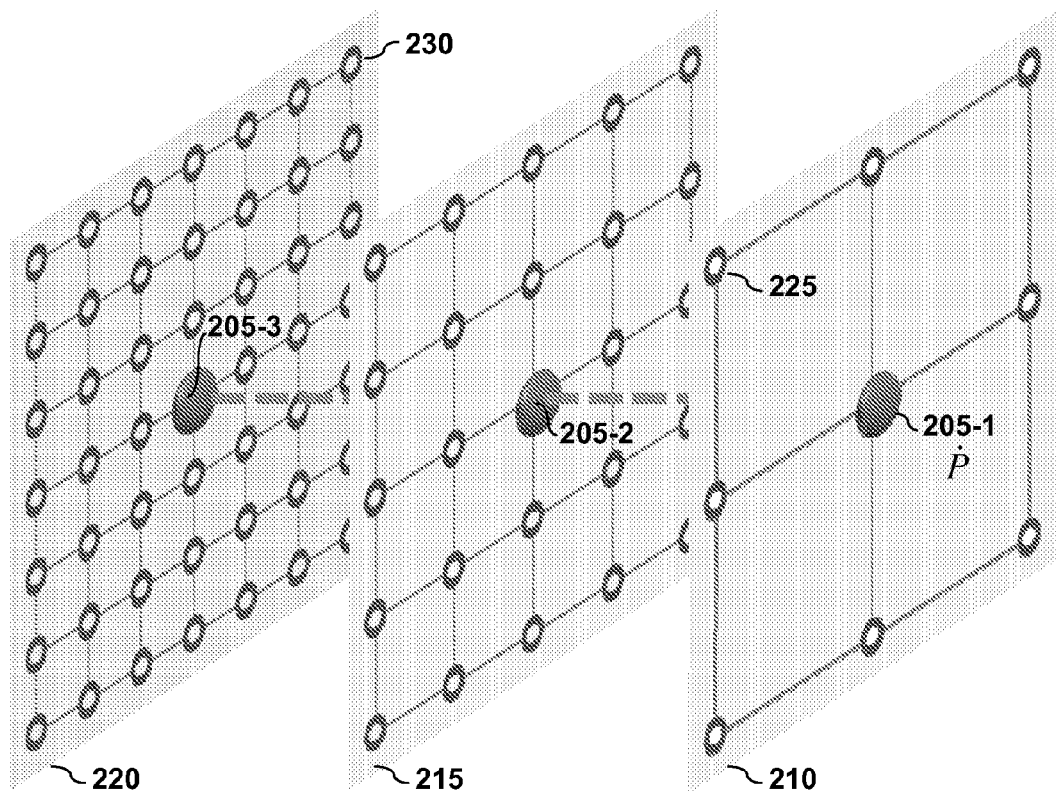
FIG. 2 is a graphically representation of a multi-dimensional neighborhood for an image node according to embodiments of the present invention.

For example, in embodiments, a classification context may be defined on a three-dimensional lattice structure in spatial and scale space. FIG. 2 is a graphically representation of a multi-dimensional, or multi-parametric, neighborhood for a local image window according to embodiments of the present invention. As can be seen in the lattice structure 200, the structure 200 spans both spatial dimensions (e.g., within a plane such as image plane 210), and also spans different size or scale (e.g., the different resolutions of image planes 210, 215, and 220). In the depicted embodiment, each node, $\dot{P}$, on the lattice refers to a scan window. Node 205-$x$ represents a local image patch of interest, which is in each of the layers (210, 215, and 220) of the lattice but with different scales. The structure 200 also includes a set or sets of neighboring image patches, represented by nodes in FIG. 2, which span both spatial and scale parameters. For example, node 225 represents a window at a particular scale and location relative to the local image patch of interest 205-$x$, and node 230 represents a different neighboring window at a particular scale and location relative to the image patch of interest 205-$x$. Thus, each node, $\dot{P}$, on the lattice may be indexed by a tuple [x, y, w], where the coordinates [x, y] refers to the window's spatial location, and w refers to the window size or scale. In embodiments, a context neighborhood $\Phi^s(\dot{P}(x, y, w))$ around $\dot{P}$ may be defined as:

$$\Phi^s(\dot{P}) = \left\{(x', y', w') \,\middle|\, \begin{array}{l} |x' - x| \leq s_x \\ |y' - y| \leq s_y \\ |w' - w| \leq s_w \end{array}\right\} \qquad (1)$$

where $s=[s_x, s_y, s_w]$ defines the neighborhood size. It shall be noted that the depicted embodiment of FIG. 2 defined a neighborhood using spatial and scale parameters; however, other parameters, such as (by way of illustration and not limitation) temporal and semantic, may also be used in defining the neighborhood for an image patch.

Returning to FIG. 1, for each node $\dot{P}(x, y, w)$, one or more image features may be extracted (110), and the corresponding classifier response values for the extract features may also be obtained (115). Examples of image features that may be extracted are described below with respect to FIGS. 5-10, although other features may be used.

For each node $\dot{P}(x, y, w)$, $F_i(x, y, w)$, $i=1, \ldots, M$, may be denoted as the response of the $i^{th}$ classifier in the previous step, where M is the number of classifiers. In embodiments, M=1 if only one classifier based on all image context features is used; however, more classifiers may be used. In fact, experiments indicate that incorporating more classifiers for this context cue may help achieve better detection performance, even if the additional classifiers are less optimal individually.

In embodiments, a classification context may be defined as:

$$A^s(\dot{P}) = \{A_{ij} | A_{ij} = F_i(\dot{Q}_j)\}_{i=1, \ldots, M, j=1, \ldots, N} \qquad (2)$$

where $\dot{Q}_j \in \Phi^s(\dot{P})$ is the $j^{th}$ node in the context neighborhood. $A_{ij}$ is the $i^{th}$ classifier response at the $j^{th}$ neighboring node. Thus, in embodiments, the classification context $A^s$ comprises M×N classifier responses in the neighborhood.

Contextual Boost

As will be explained in more detail below, embodiments of training and detecting of objects exploit the classification context using iterative classification, referred to herein as contextual boost. Since the classification context combines contextual cues in the neighborhood, through iterations it implicitly propagates to greater areas and thus provides more global constraints to the classification process.

In embodiments, at each iteration, the classification context $A^s$ from the previous iteration is used as additional features to construct a new or augmented contextual boost feature set. In embodiments, the augmented feature set for node $\dot{P}$ at the $r^{th}$ iteration is thus:

$$C_r^s(\dot{P}) = \{C_{r-1}^s(\dot{P}), A_r^s(\dot{P})\} \quad (3)$$

In embodiments, for the first iteration (i.e., r=1), the augmented feature set $C_0^s(\dot{P})$ may comprise the image contextual features from the local image window and the contextual neighbor regions as defined. Examples of image contextual features are described below, although one skilled in the art shall recognize that other features may alternatively or additionally be used.

Contextual Boost Classification—Training

Figure 3:
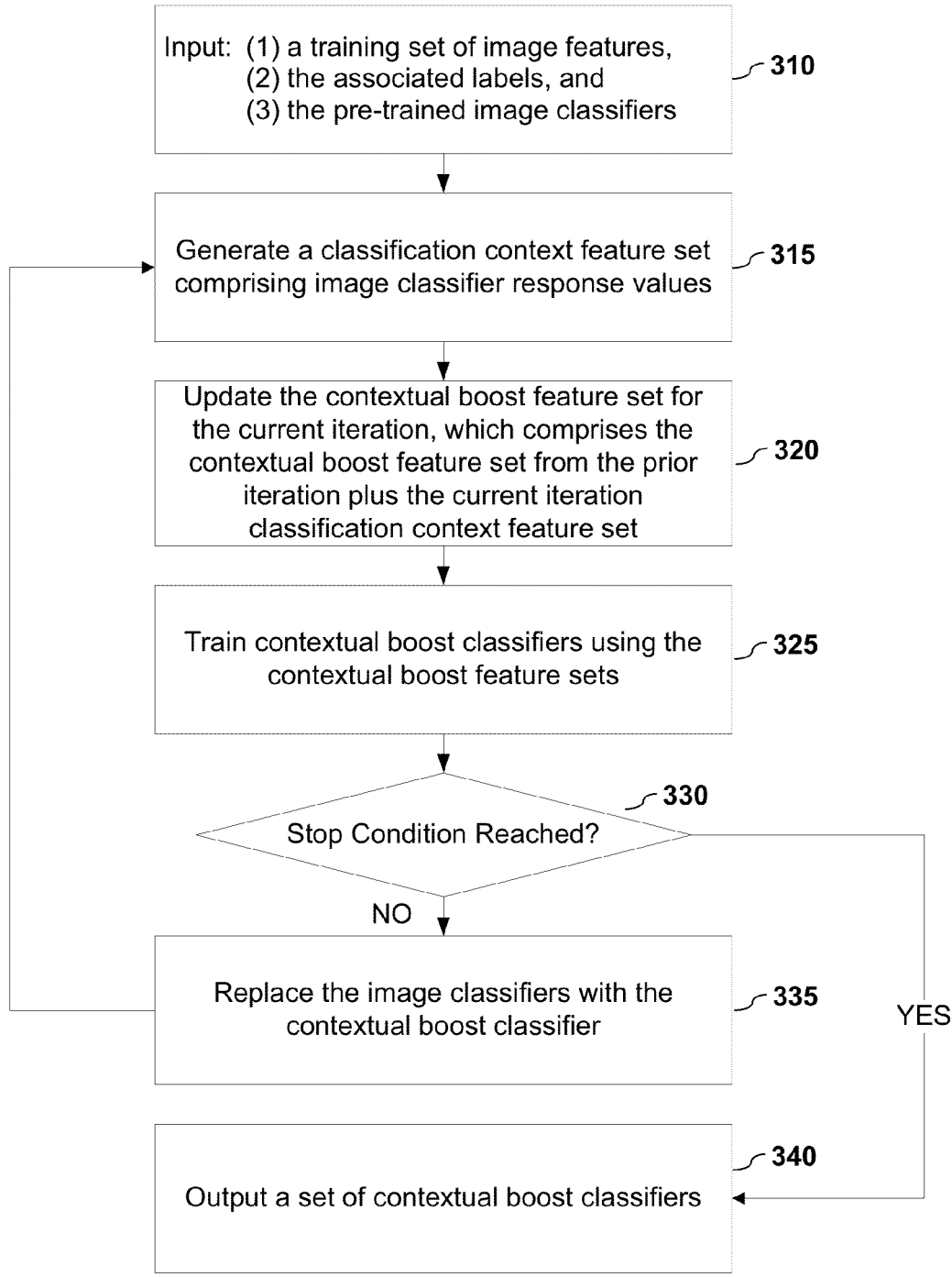
FIG. 3 presents a method for training a contextual boost classifier according to embodiments of the present invention.

FIG. 3 presents a method for training a contextual boost classifier according to embodiments of the present invention. As depicted in FIG. 3, in embodiments, the inputs are (310) a training set of image context features, the associated binary labels $g(\dot{P})$ (positive or negative) regarding whether a training image does or does not contain the object of interest, and the pre-learned classifiers $\{F_i(\bullet)\}_{i=1}^M$. One skilled in the art shall recognize that, in alternative embodiments, other effective features or classifiers may be directly included.

In the depicted embodiments, the classification context $A_r^s(\dot{P})$ is computed (315) using Equation (2). Then, an augmented feature set $C_r^s(\dot{P})$, which may be also be referred to as the contextual boost feature set, for the current iteration is generated (320) using Equation (3). The augmented feature set comprises the contextual boost feature set from the prior iteration plus the current iteration classification context feature set. At the first iteration, when generating the first contextual boost feature set $C_1^s(\dot{P})$, there is no prior iteration feature set; thus, in embodiments, the training set of image context features may be used as the prior iteration feature set $C_0^s(\dot{P})$. It shall be noted that in alternative embodiments, the initialization of the augmented feature $C_r^s(\dot{P})$ at the first iteration may be done in different ways and using different values. One skilled in the art shall recognize that other features may be used instead of contextual image features, such as the Haar, Shapelet, HOG-LBP, etc.

In embodiments, a new Adaboost classifier $H_r(\bullet)$ for the iteration is then constructed using the contextual boost feature set and the image labels for the training set to get Equation (4):

$$H_r(\dot{P}) = \sum_{i=0}^{M} \sum_{j=0}^{N} h_{ij}(C_r^s(\dot{P}_k)[i,j]) \quad (4)$$

where $h_{ij}(\bullet)$ represents weak classifiers.

Thus, for example, during the first iteration, a new classifier $H_1(\bullet)$ is constructed using $[C_1^s(\dot{P}), g(\dot{P})]$.

Returning to FIG. 3, in embodiments, a stop condition is checked (330) to determine whether or not to stop the iteration process. In embodiments, the stop condition may be related to an error measurement associated with detection. For example, at each iteration r, the error rate of $H_r(\bullet)$ may be evaluated. In embodiments, the following equation may be used to gauge error:

$$\varepsilon = \frac{1}{K} \sum_{k=1}^{K} |sgn(H_r(\dot{P}_k)) - g(\dot{P}_k)| \quad (5)$$

Thus, in embodiments, the process may iterate until the error level triggers a stop conditions. Examples of stop condition include, but are not limited to, that the error is below a threshold, that the change in error between iterations is below a threshold value, that the error rate converges, and that a set number of iteration has been reached. One skilled in the art shall recognize that there are numerous ways to set stop conditions when iterating, particularly when iterating to training classifiers, which may be employed herein. It shall be noted that, in embodiment, across iterations we only add more context features to the classification process. Thus, the miss rate improves monotonically and guarantees the convergence of the training procedure.

If the stop condition has not been reached (330), the current contextual boost classifier replaces the pre-learned classifiers $\{F_i(\bullet)\}$. The process returns to step 315, in which the pre-learned classifiers, which is now the contextual boost classifier, is used to generate a classification context feature set for the next iteration. For example, continuing with the first iteration example, the contextual boost classifier $H_1(\bullet)$ replaces $\{F_i(\bullet)\}_{i=1}^M$ with M set to 1, and this classifier $(H_1(\bullet) = F_1(\bullet))$ is used to compute the classification context for the next iteration, $A_2^s(\dot{P})$.

An embodiment of a training procedure of the contextual boost classification is depicted in Table 1:

TABLE 1

Contextual Boost-Training

| | |
|---|---|
| Input: | Training set $\Psi = \{[C_0^s(\dot{P}_k), g(\dot{P}_k)]\}_{k=1}^K$ |
| | Image features classifiers $\{F_i(\bullet)\}_{i=1}^M$ |
| 1. | $\varepsilon' = \varepsilon = 1, R = 0$. |
| 2. | do |
| 3. | $\varepsilon' = \varepsilon, R = R + 1, r = R$. |
| 4. | Compute $A_r^s(\dot{P}_k)$ using $\{F_i(\bullet)\}_{i=1}^M$ and Equation 2. |
| 5. | Compute $C_r^s(\dot{P}_k)$ using $A_r^s(\dot{P}_k)$ and Equation (3). |
| 6. | Train classifier $H_r(\bullet)$ using $\Psi$ and get |
| | $H_r(\dot{P}) = \sum_{i=0}^{M} \sum_{j=0}^{N} h_{ij}(C_r^s(\dot{P}_k)[i,j])$ (Equation 4) |
| | where $h_{ij}(\bullet)$ represents weak classifiers. |
| 7. | $\varepsilon = \frac{1}{K} \sum_{k=1}^{K} |sgn(H_r(\dot{P}_k)) - g(\dot{P}_k)|$. |
| 8. | Replace $\{F_i(\bullet)\}_{i=1}^M$ with $\{H_r(\bullet)\}$, set M = 1. |
| 9. | while $\varepsilon - \varepsilon' < \eta$ (where $\eta$ = a pre-set threshold error value). |
| 10. | Output: a set of contextutal boost classifiers $\{H_r(\bullet)\}_{r=1}^R$ |

Contextual Boost Classification—Testing/Detecting

Figure 4:
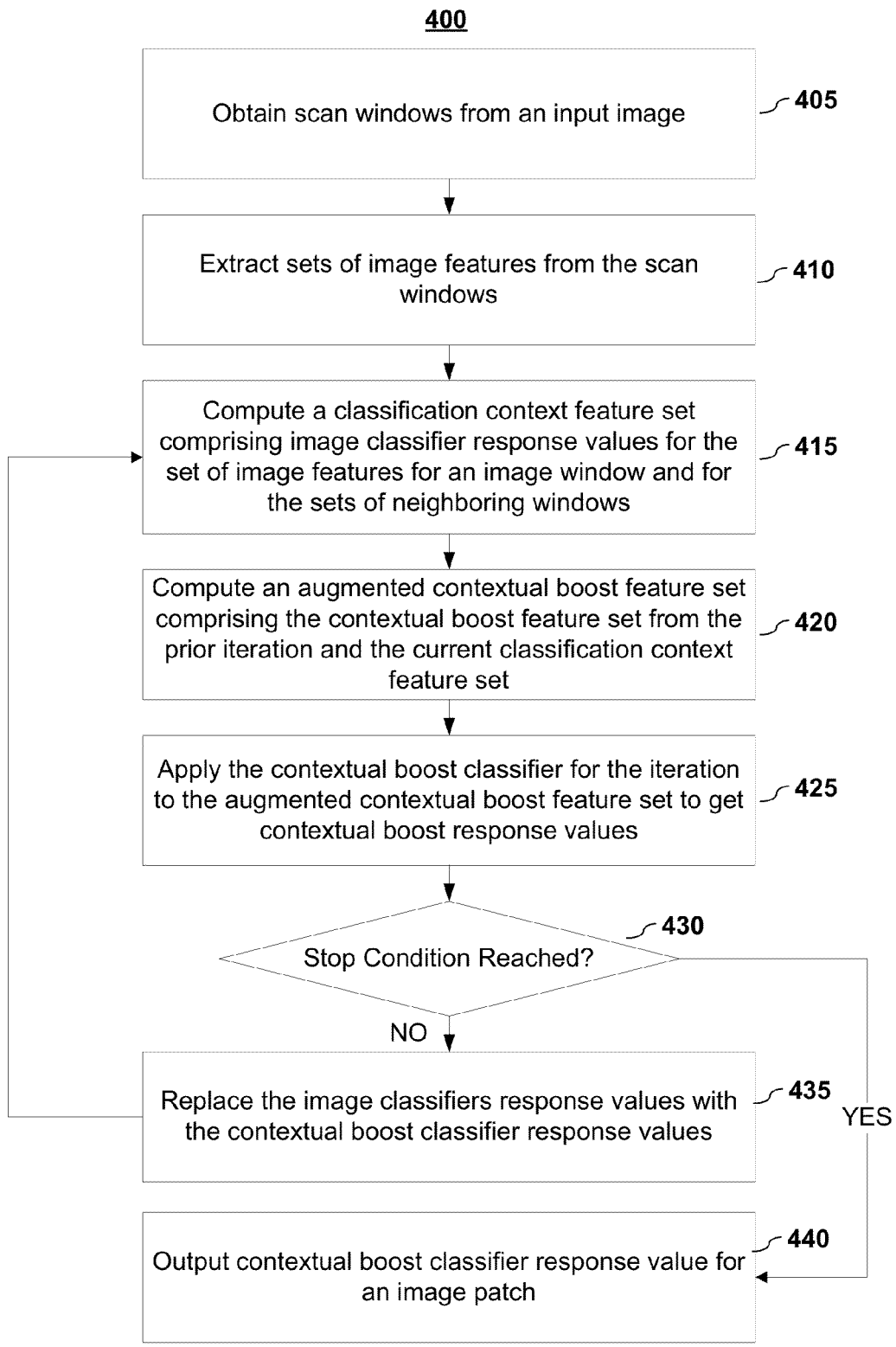
FIG. 4 presents a method for using a contextual boost classifier for detecting an object of interest in an image according to embodiments of the present invention.

FIG. 4 presents a method for using a contextual boost classifier for detecting an object of interest in an image according to embodiments of the present invention. To identify an object, such as a human, in a new image, scan windows are obtained (405) from an input image. The image context features, $C_0^s(\dot{P})$, are extracted (410) at all scan windows.

Examples of image features that may be extracted are described below with respect to FIGS. 5-10, although other features may be used. The corresponding image context-based classifiers are applied to these features to compute the responses $\{F_i(\dot{P})\}$, which are used to generate (415) a classification context feature set or sets using Equation (2).

As depicted in the embodiment shown in FIG. 4, the sequence of classifiers $H_r(\cdot)$ obtained in the contextual boost training process are used to label the windows as containing or not containing the object of interest. In embodiments, the procedure comprises R iterations, referring to the contextual boost classifier sequence obtained from the training process. At the $r^{th}$ iteration, the contextual boost feature set is computed (420) based on the contextual boost feature set from the $(r-1)^{th}$ iteration augmented by the classification context for the current $r^{th}$ iteration, as set forth in Equation (3). Like the training phase, at the first iteration, when generating the first contextual boost feature set $C_1^s(\dot{P})$, there is no prior iteration feature set; thus, in embodiments, the image context features may be used as the prior iteration feature set $C_0^s(\dot{P})$.

Then, the classifier $H_r(\cdot)$ may be applied (425) on the augmented contextual boost features to obtain contextual boost classifier response values. In embodiments, if this is not (430) the last iteration, these responses are used in the next iteration to compute the classification context by replacing (435) the prior iteration image classifiers response values with the contextual boost classifier response values. In embodiments, for each node, it is a single value, but because values from a neighborhood are used, there is a vector of values.

In embodiments, after the last iteration, a contextual boost classifier response is output (440) for each window. In embodiments, the final classifier response of each window may be compared with a threshold, which may be pre-set, to decide whether the window does or does not contain the object. In embodiments, the nearby detected human figure windows may be grouped by non-maximal suppression.

An embodiment of a training procedure of the contextual boost classification is depicted in Table 2:

TABLE 2

Contextual Boost - Detecting

Input: (a) Image context features $\{C_0^s(\dot{P}_k)\}_{k=1}^K$
(b) Image context-based classifiers $\{F_i(\cdot)\}_{i=1}^M$
(c) Contextual boost classifiers $\{H_r(\cdot)\}_{r=1}^R$
1. For r = 1, 2, ..., R.
2.     Compute $A_r^s(\dot{P}_k)$ using $\{F_i(\cdot)\}_{i=1}^M$ and Equation (2).
3.     Compute $C_r^s(\dot{P}_k)$ using $A_r^s(\dot{P}_k)$ and Equation (3).
4.     Compute $\{H_r(\dot{P}_k)\}$ using Equation (4)
5.     Replace $\{F_i(\cdot)\}_{i=1}^M$ with $\{H_r(\cdot)\}$, set M = 1.
6. end
7. Output: Labels for image windows $\{[g(\dot{P}_k)|g(\dot{P}_k)= H_R(\dot{P}_k)]\}_{k=1}^K$ It shall be noted that since the classification context incorporates information in the neighborhood (e.g., spatial and scale neighborhood), it propagates to greater coverage through iterations without explicitly enlarging the scan windows. Thus, more iterations of contextual boost makes more global constraints available to the classification process and generally leads to better detection accuracy. However, it has been noticed that, in embodiments of the methodology, it often converges in three iterations and the accuracy improves much greater in the first iteration than in later iterations. One reason may be that the context cues for detection are stronger in the nearby neighborhood and get weaker where farther away. Another point to note is that contextual boost classification does not cost extra computation on feature extraction, since the additional features at each iteration are simply the classifier responses from the previous iteration, which need to be computed anyway. Thus, the additional cost at each iteration is limited on the linear classification process, which is usually inexpensive.

It shall be noted that the contextual boost frameworks allow for easy incorporation of other successful sliding-window human detectors. Also, in embodiments, it is straightforward to replace the low-level contextual feature and Adaboost classifier with any other image feature and classifier and the methodology flow remains valid.

It shall also be noted that the contextual boost may be directly applied as a cascaded component to arbitrary scanning window based approaches to improve whatever detection rates the existing algorithms can approach.

Image Context Features

As mentioned above, image features are extracted from image patches. One skilled in the art shall recognize that a number of features may be extracted and may be used in various combinations. Because features extracted from multiple resolutions can help achieved better performance than a single scale, a combination of context cues from multiple scales may be used to construct the image context feature descriptor.

In embodiments, image context feature descriptor may comprise two major types of features, local difference pattern (LDP) and multi-scale histogram of gradients (HOGs). Embodiments of local difference pattern have been disclosed in the commonly assigned and co-pending U.S. Patent Application identified in paragraph [0002] above.

Similarly, embodiments of multi-scale histogram of gradients (HOGs) have been disclosed in the commonly assigned and co-pending U.S. Patent Application identified in paragraph [0003] above.

Although both of these patent documents are incorporated by reference herein, general descriptions are provided for convenience below.

Local Difference Pattern (LDP)

Figure 5:
FIG. 5 depicts a sample image window with a context region according to embodiments of the present invention.
Figure 6:
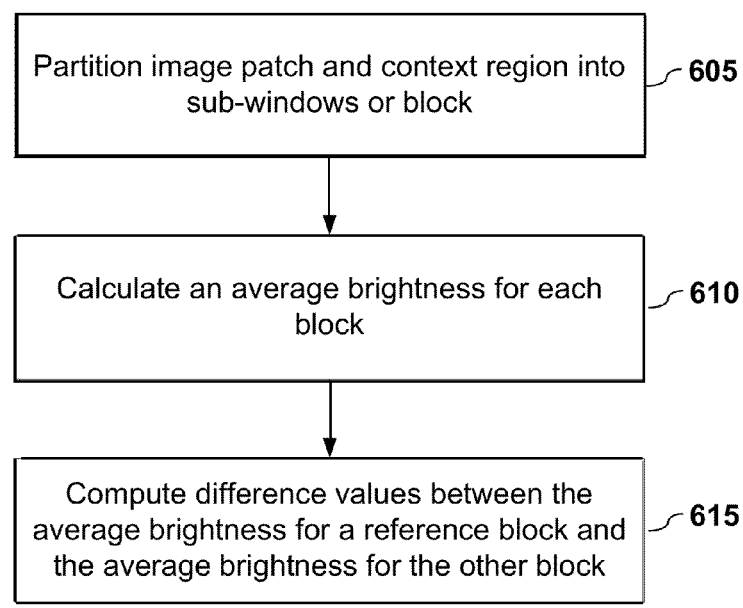
FIG. 6 depicts a local difference pattern methodology according to embodiments of the present invention.

FIG. 6 depicts a local difference pattern methodology according to embodiments of the present invention. As illustrated in FIG. 5, in embodiments, an image patch 505 along with context region 510 is obtained from an input image. The image patch 505 depicts an example of an image patch that may contain an object of interest, which in this example is a human figure. In the current description, systems and methods shall be described in terms of an image patch from an input image, but one skilled in the art shall recognize that the systems and methods may be applied to a plurality of image patches from an image or images. In embodiments, the image patch may be obtained from a scan window image patch. The scan window image patch may be obtained from applying an existing detector, such as AdaBoost or SVM, to an input image or images to obtain one or more scan window image patches. In embodiments, the initial scan window image patch is expanded to double by including a context region. For example, the length (l) and width (w) of the initial scan window may each be doubled so that the context region, with the initial image patch centered within the context region, has dimensions of 2l×2w. In embodiments, if the initial image scan is at or near an edge of the image so that a full context region cannot be formed from original image pixels, pixels may be added to the missing region or regions. In embodiments, the missing pixels may be black, have the same average brightness as a local region, may be an extension of a line or portion of pixel values at an edge of the missing region, may be some filled with some portion of the image, or may have some other configuration. It shall be noted that other context region sizes, shapes, and configurations may be used, including having no additional context region in one or more context region portions or directions.

Figure 7:
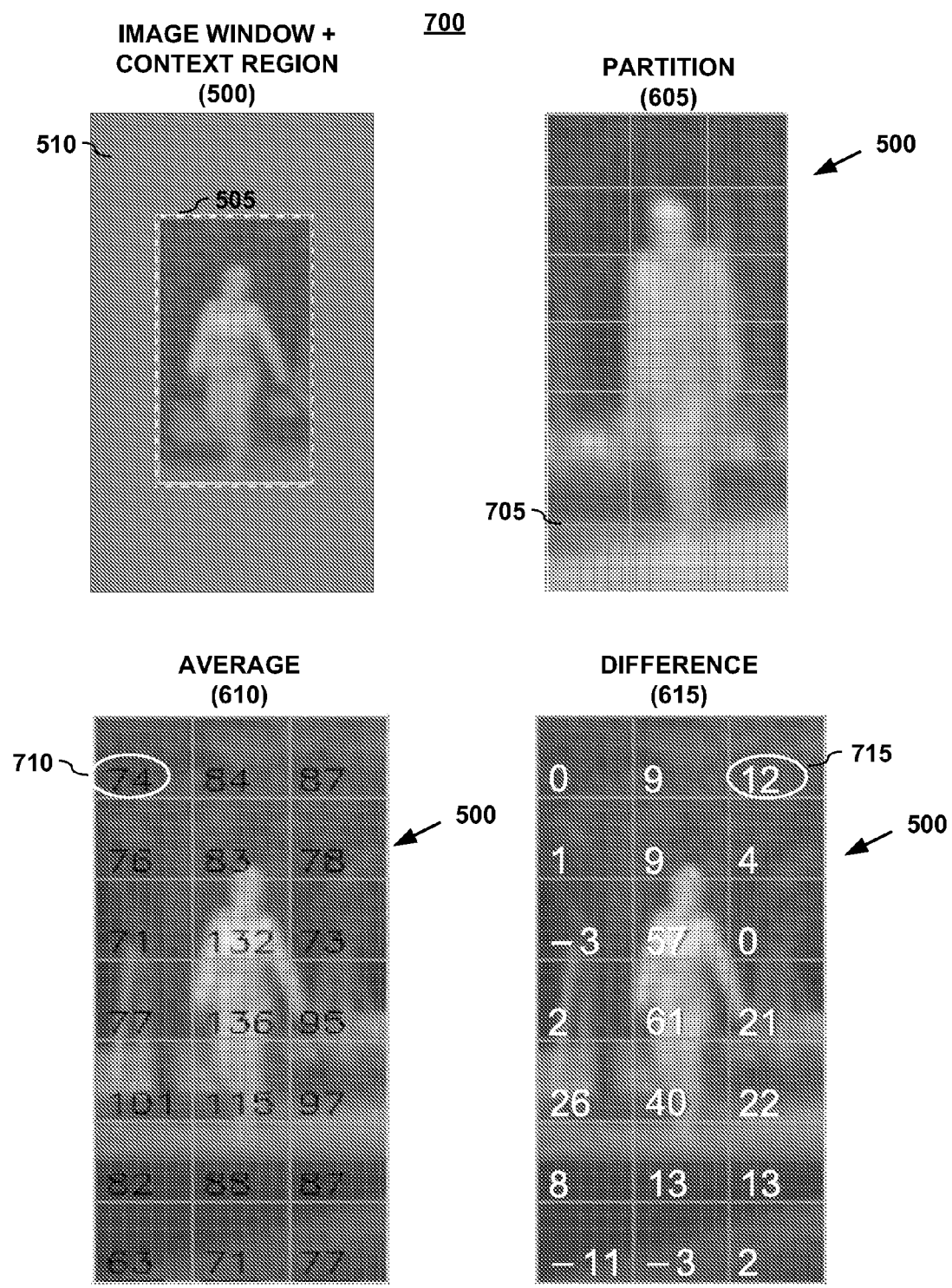
FIG. 7 illustrations different stages of generating a local difference pattern according to embodiments of the present invention.

Returning to FIG. 6, the image patch 505 and context region 510 may be divided (605) into a set of sub-windows or block. It shall be note that the use of the term "set" in this patent document shall include any number of items. FIG. 7 illustrations different stages of generating a local difference pattern according to embodiments of the present invention. In FIG. 7, the image patch and context region 500 is partitioned into a set of 3×7 blocks 705, although other numbers of image blocks (such as 9×17, by way of illustration and not limitation) and other shapes and configurations may be used.

For each block, an average brightness or intensity for each block is calculated (610). In embodiments, the average may be the mean, median, or mode for the block. FIG. 7 depicts the example image patch and context region 500 with the average intensity values (e.g., value 710) for each of the blocks. In the depicted example, the numbers represent rounded values of decimal average values.

With average intensity values for each of the blocks, a difference value may be computed (615) between the average brightness for a reference block, or the average brightness of a portion thereof, and each of the average brightness values for the other blocks. In embodiments, the reference intensity value may be obtained from the top, left corner block (e.g., value 710). In embodiments, the top, left corner block is selected because it is likely to contain a significant portion of background pixel values for both positive and negative samples. Thus, a top, left corner reference block is more consistent for distinguishing objects, like human figures, from background, which has been confirmed in experiments. One skilled in the art shall recognize that the reference value may be selected from a different block or from a different source, including but not limited to a number of blocks, a different portion of the input image, or a combination thereof. For example, in embodiments, the average of the values of the four corner blocks may be used. One skilled in the art shall recognize that the local difference pattern represents how much contrast exists within an image patch with respect to the reference block. In FIG. 7, the candidate patch 500 is overlaid (615) with the difference values for each block (e.g., value 715).

One skilled in the art shall recognize that although other pattern methods exist, none are like the local difference pattern presented herein. For example, Local Binary Pattern (LBP) is a well-known pattern methodology in the art of detection. However, it must be noted that there are significant differences. First, LBP does not compute difference values. Rather, it is simply a binary value where greater than a reference is set to "1" and less than the reference is set to "0". Second, LBP is used for detecting objects of interest, not for detecting backgrounds. As a result, it LBP does not include a context region as the LDP does. Third, since the LBP is concerned with detecting the object of interest and not modeling the background, it takes as the reference block the center block because it is more likely to contain the object of interest, which also means it is less likely to contain background pixel values.

Other differences and/or different patterns will be apparent to one skilled in the art.

High-Resolution Feature

FIG. 8 presents a method 800 for forming a high-resolution feature according to embodiments of the present invention. As illustrated in FIG. 2, in embodiments, an image patch 505 is obtained from an input image. The image patch may be obtained in like manner as described previously. In embodiments, the image patch 505 is resized (805) to a normalized high-resolution size (e.g., 64×128 pixels, although other sizes may be used), if it is not at the normalized sized. The normalized image patch 505-HR is used to compute (810) a high-resolution feature 815, which may be one or more features. In embodiments, the feature may be a histogram of gradient (HoG) feature descriptors, which is well known to those of skill in the art. It shall be noted that other methods may be used to generate a feature from the normalized image patch. For example, possible alternatives include, but are not limited to, LBP (Local Binary Pattern), Shapelet, Harr, Channel Features, and etc.

It shall also be noted that in alternative embodiments, one or more features may be extracted from a context region for the image patch and combined with the feature from the image patch in forming a high-resolution feature. Examples of ways to combine the features includes, but is not limited to, adding, concatenating, subtracting, averaging, and the like.

Mid-Resolution Feature(s)

Figure 9:
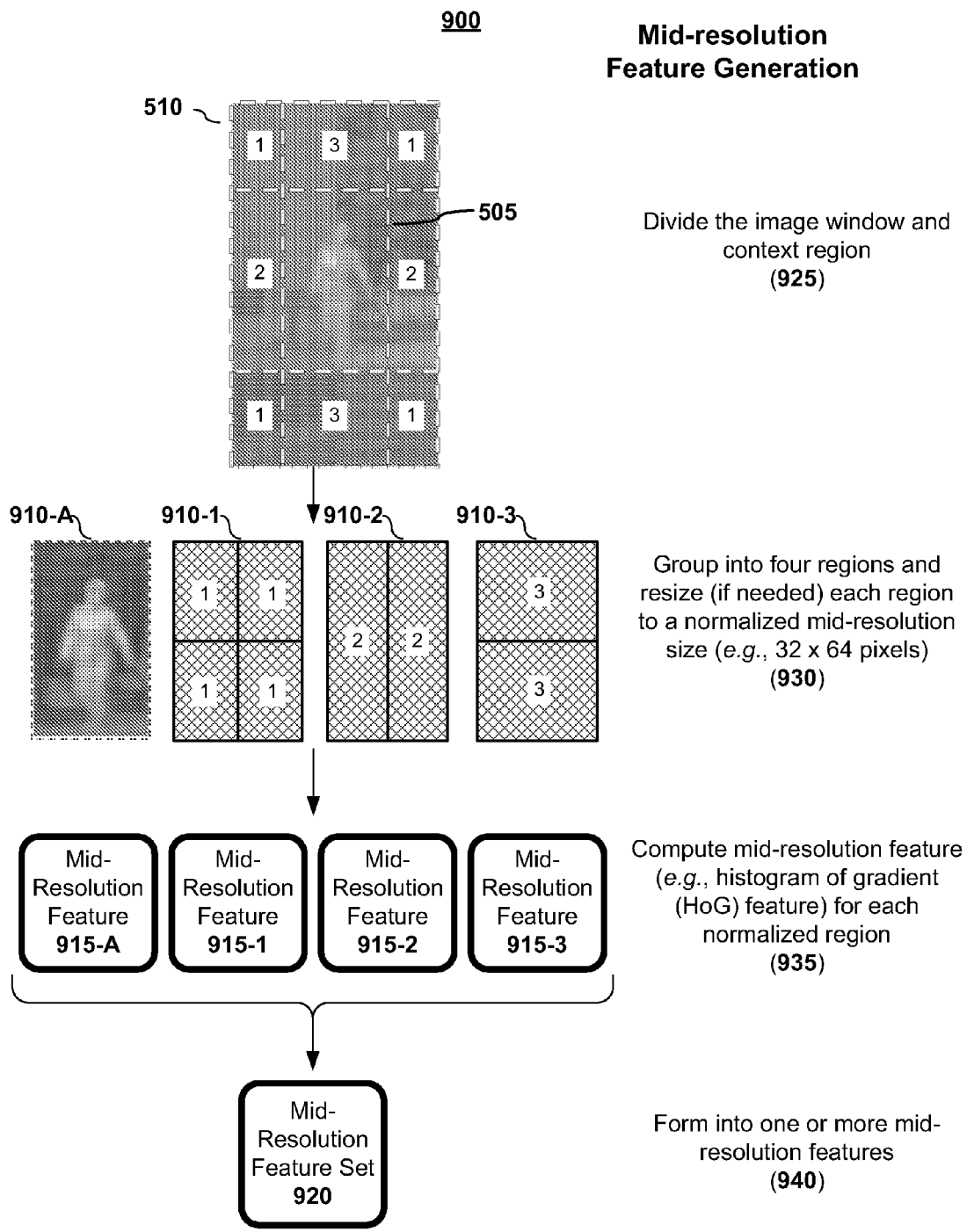
FIG. 9 presents a method for forming a mid-resolution, or mid-scale, feature according to embodiments of the present invention.

FIG. 9 presents a method 900 for forming a mid-resolution feature or features according to embodiments of the present invention. As illustrated in FIG. 9, in embodiments, an image patch 505 and context region 510 are obtained from an input image. The image patch and context region may be obtained as described previously. It shall be noted that, in embodiments, the step of obtaining the image patch, or local image window, and context region may be done once in preparation for generating the multi-scale feature or features. In embodiments, the image patch 505 is resized (930) to a normalized mid-resolution size (e.g., 32×64 pixels, although other sizes may be used), if it is not at that size.

In embodiments, the context region 510 is divided to form three groups or regions. As depicted in the embodiment in FIG. 9, the context region is divided into regions 1, 2, and 3, and the like-numbered regions are combined into three regions or groups 910-1, 910-2, and 910-3. It shall be noted that the context region may be divided into different portions or regions, and may be combined in different ways. In embodiments, each portion 910-$x$ has or is normalized to the mid-resolution size. One skilled in the art shall recognize that the resizing, when needed, may be done in different order or different configurations. For example, in embodiments, the context region with the image patch may together be resized to twice the mid-resolution size (e.g., 64×128 pixels). Thus, each group of regions (910-1, 910-2, and 910-3) forms a patch of the same size as the center scan window image patch 910-A (32×64 pixels, in this example).

A mid-resolution feature or features (915-A, 915-1, 915-2, and 915-3) are computed (935) for each of the four normalized regions. In embodiments, a feature may be a histogram of gradient (HoG) feature descriptors, although other methods may be used to generate a feature from the normalized regions.

In embodiments, the mid-resolution features 915-$x$ may be combined into one or more mid-resolution feature descriptors. In embodiments, the mid-resolution feature of the image patch 915-A may be one mid-resolution feature descriptor and the mid-resolution feature descriptors 915-1, 915-2, and 915-3 of the context portions may be combined (340) to form another mid-resolution feature. Thus, in embodiments, the mid-resolution feature descriptor may be two features: the first computed in the local image window 915-A, and the second is the sum of the HOGs in the three neighborhood groups 915-1, 915-2, and 915-3. In alternative embodiments, these two features may be combined into a single feature. One skilled in the art shall recognize that features may be combined in a number of ways, such as addition, concatenation, subtraction, averaging, etc. For example, in embodiments, the features may be combined by stacking the normalized histograms into a single HoG vector.

Low-Resolution Feature

Figure 10:
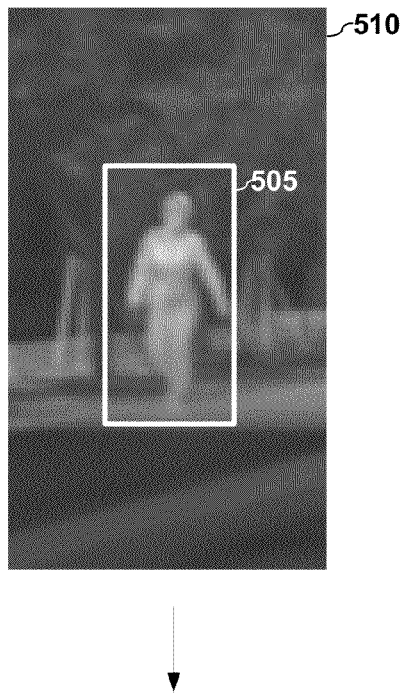
FIG. 10 presents a method for forming a low-resolution, or low-scale, feature according to embodiments of the present invention.

FIG. 10 presents a method 1000 for forming a low-resolution feature according to embodiments of the present invention. As illustrated in FIG. 10, in embodiments, an image patch 505 and context region 510 are obtained from an input image. The image patch and context region may be obtained as previously described. Also as previously noted, the step of obtaining the image patch and context region may be done once in preparation for generating the multi-scale feature or features. In embodiments, the context region together with the image patch 500 are resized (1005) to a low-resolution size (e.g., 32×64 pixels, although other sizes may be used), if not at the low-resolution size. In embodiments, a low-resolution feature or features 1015 are computed (1010) from the combined normalized low-resolution context region and image patch. In embodiments, the feature may be a histogram of gradient (HoG) feature descriptors, although other methods may be used to generate a feature from the normalized regions. One skilled in the art shall recognize that other configurations of the image patch and context region and other features may be generated.

Perspective Context Features

It is not uncommon for objects of interest in images to appear at certain regions and with certain sizes. Information such as location and size of the object in an image can provide important perspective context of the camera. Embodiment of the present invention may generate and use this contextual information to aid in object recognition.

Given an image patch from an image, a perspective context feature of the image feature may be generated. In embodiments, the perspective context feature comprises the location (x, y) of the image patch within the image and/or the size (w, h) of the image patch. The location (x, y) may represent the position of a set reference point of an image patch, such as its center pixel location, a corner pixel location, or the like. The size (w, h) of the image patch may represent the width and height of the image patch. In embodiments, the perspective context descriptor may in the form of (x, y, w, h). One skilled in the art shall recognize the perspective context descriptor may be in different forms and configurations.

Feature Combinations

It shall be noted that any of the LDP, high-resolution, mid-resolution, low-resolution, and perspective features, or any constitute parts thereof, may be combined into feature descriptors. For example, in embodiments, all of the features may be combined together. In embodiments, the four HOGs from all three scales may constitute the multi-scale HOGs to incorporate the cues in shape, spatial, and scale spaces. In alternative embodiments, by way of example, a high-resolution feature and a low-resolution feature may be combined to form a feature. Or, by way of another example, the high-resolution feature may be combined with the perspective feature. In yet another example, the mid-resolution feature of the just the image patch may be combined with the low-resolution and perspective features to form a feature. One skilled in the art shall recognize that any number of permutations and combinations of the features may be used to form composite features. Furthermore, any or all of the features and any and all different combinations or permutations of features may be used as part of the image context features for the classification context.

In embodiments, the image context descriptor is constructed by concatenating the multi-scale HOGs and LDP features. In experiments, the Adaboost classifier based on this descriptor achieved the best performance compared to the four individual HOGs, LDP, and the different combinations of them; the contextual boost classifier is then constructed using the image context features and the associated classifiers.

System Embodiments—Training

Figure 11:
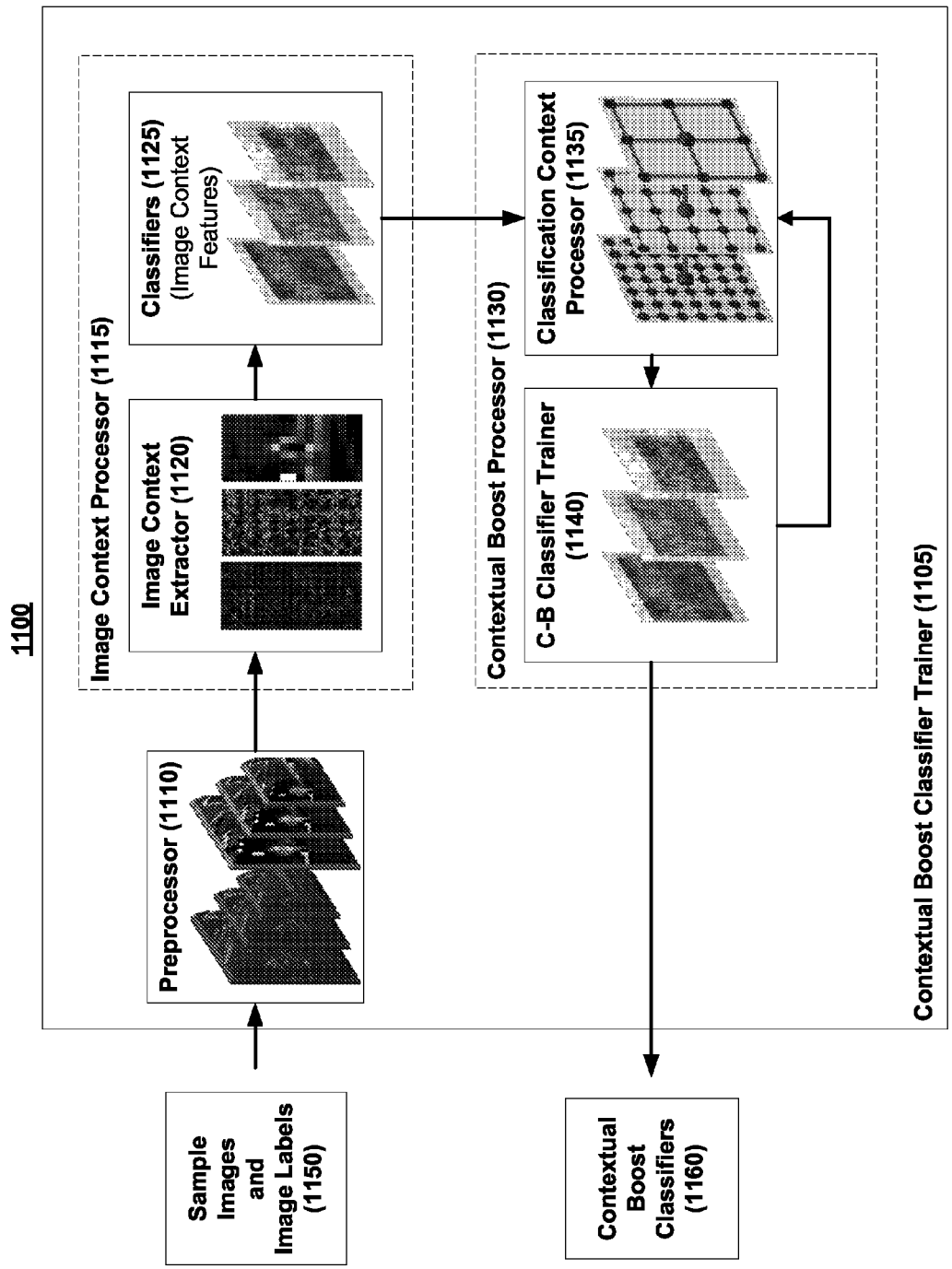
FIG. 11 depicts a system and process flow for training a detection system using according to embodiments of the present invention.

FIG. 11 depicts a contextual boost classifier training system 1105 according to embodiments of the present invention. In embodiments, the contextual boost classifier training system 1105 performs one or more embodiments of the training methods described above. For example, in embodiments, the contextual boost classifier system 1205 may perform the methods of FIG. 3, Table 1, or both. In embodiments, the system 1105 comprises a preprocessor 1110, an image context processor 1115, and a contextual boost processor 1130. In the depicted embodiment, the image context processor 1115 comprises an image context feature extractor 1120 and classifiers 1125. And, in the depicted embodiment, the contextual boost processor 1130 comprises a classification context processor 1135 and a contextual boost (C-B) classifier trainer 1140. One skilled in the art shall recognize that other system configurations may be used to perform the classifier training. In embodiments, system 1105, or parts thereof, may be implemented using a computing system, such as one described with reference to FIG. 14.

In embodiments, the system comprises a preprocess 1110, which may be optional, that receives the sample images 1150 and performs steps that aid in efficient processing. For example, extracting the multi-scale HOGs and LDP features across scan windows one-by-one leads to redundant computation since the neighboring windows overlap. Similarly redundant calculation exists across different scales of the scan windows. In embodiments, to avoid this redundancy, the scan step size may be set as the HOG cell size and use efficient preprocessing. Preprocessor may be used to build an image pyramid at multiple scales. At each scale, the image is divided into blocks and pixel gradients and per-block averages are computed. These values may be only computed once and the multi-scale HOGs and LDP features across all scan windows can be calculated from them without re-computation. In embodiments, the preprocessor may be part of the image context processor 1115, or alternatively, the functions of the preprocessor may be performed by the image context processor 1115.

In embodiments, the image context processor 1115 receives the preprocessed data from the preprocessor 1110 to extract features and generate classifier response values for the extracted features. In embodiments, the image context extractor 1120 uses sliding windows scanned at individual scales and image context features are extracted from the pre-computed gradients and block average values for each window.

Figure 13:
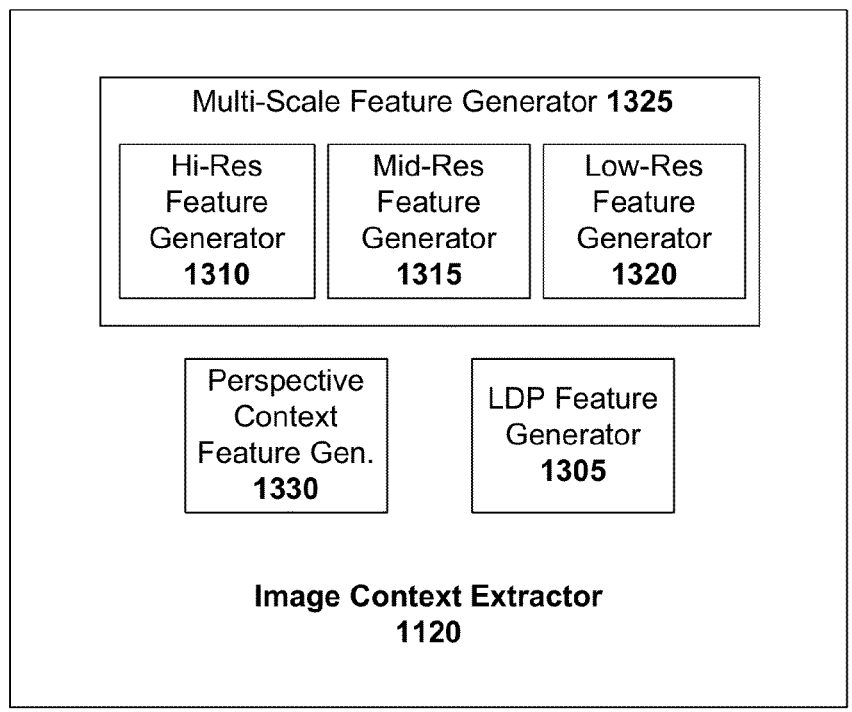
FIG. 13 depicts an image context extractor according to embodiments of the present invention.

Examples of features that may be extracted, and methods for extracting, are the multi-scale HOGs and LDP feature describe above, although one skilled in the art shall recognize that other features may also be used. FIG. 13 depicts an image context extractor 1120 that may use some of the features previously described according to embodiments of the present invention. In the depicted embodiment, the image context extractor 1120 comprises a multi-scale feature generator 1325, a perspective context feature generator 1330, and a LDP feature generator 1305. In embodiments, a multi-scale feature generator 1325 comprises a high-resolution feature generator 1310, a mid-resolution feature generator 1315, and a low-resolution feature generator 1320. Each of these components may perform the corresponding feature generation as described above with respect to FIGS. 5-10. It shall be noted that the image context extractor 1120 may include additional feature generators. Furthermore, the image context extractor 1120 may also provide the functionality to use and to combine the features in any set of combinations and permutations.

In embodiments, the classifier 1125 applies classifiers based on the image context features across the scan windows to obtain image context feature response values that are used in the classification contexts.

In embodiments, the contextual boost processor 1130 receives the images and classifier response values and uses this information to generate a set of contextual boost classifiers 1160. In embodiments, the classification context receives the classifier response values and generates classification context feature sets. The contextual boost classifier trainer 1140 applies a contextual boost classifier based on the augmented features on the scan windows and the responses form additional features for the next iteration. In embodiments, the process iterates until a stop condition is met, and the contextual boost processor 1130 outputs a set of contextual boost classifiers 1160.

System Embodiments—Detecting

Figure 12:
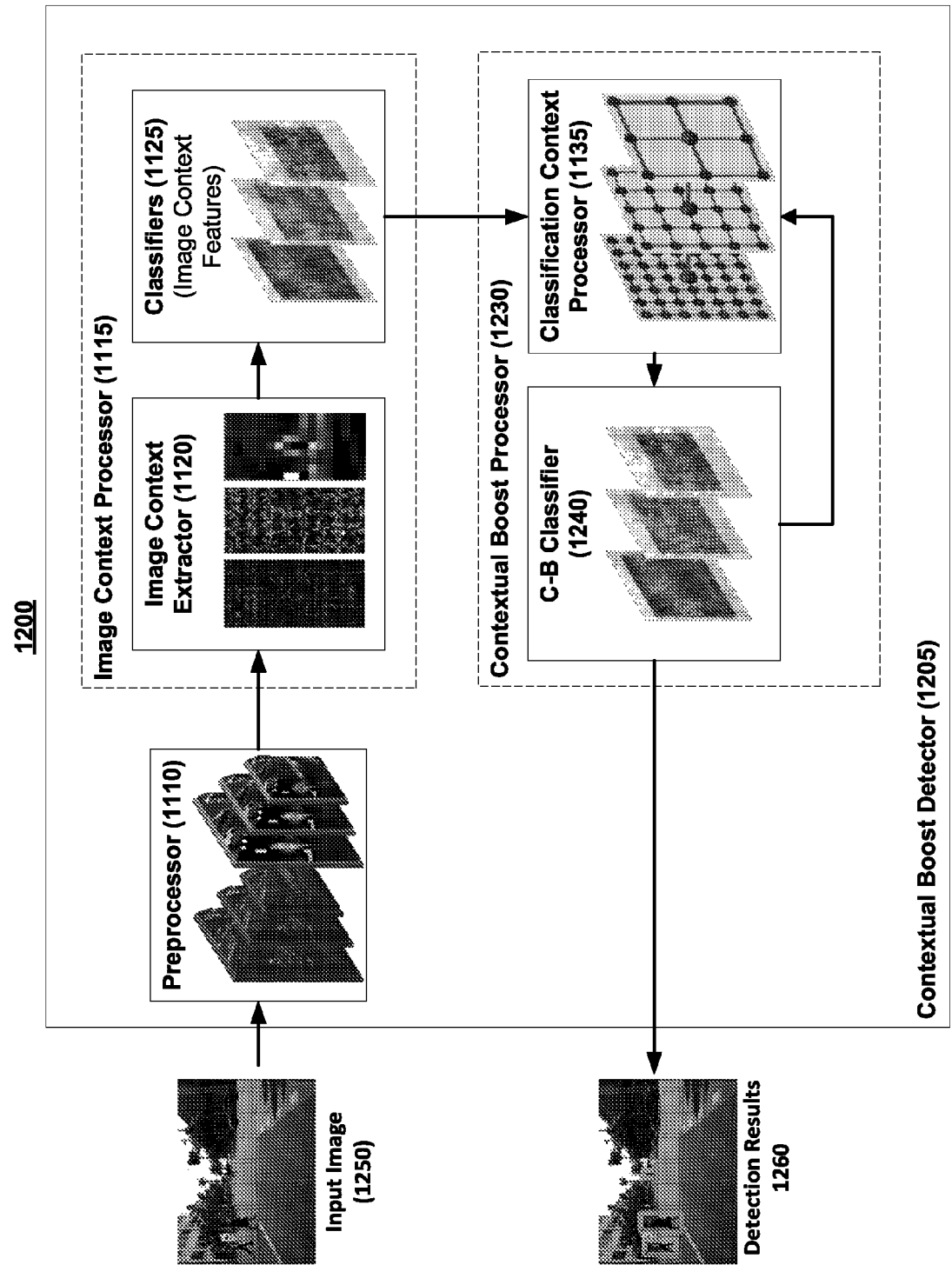
FIG. 12 depicts a system and process flow for training a detection system using multi-scale and perspective features according to embodiments of the present invention.

FIG. 12 depicts a contextual boost classifier or detector system 1205 according to embodiments of the present invention. In embodiments, the contextual boost classifier system 1205 performs one or more embodiments of the detecting methods described above. For example, in embodiments, the contextual boost classifier system 1205 may perform the methods of FIG. 4, Table 2, or both. In embodiments, the system 1205 comprises a preprocessor 1110, an image context processor 1115, and a contextual boost processor 1230. In the depicted embodiment, the image context processor 1115 comprises an image context feature extractor 1120 and classifiers 1125. And, in the depicted embodiment, the contextual boost processor 1230 comprises a classification context processor 1135 and a contextual boost (C-B) classifier 1240. One skilled in the art shall recognize that other system configurations may be used to perform classification/detecting. In embodiments, system 1205, or parts thereof, may be implemented using a computing system, such as one described with reference to FIG. 14.

It shall be noted that a system may be configured for both training and detection and that the same or like components for both tasks may be configured to function in both capacities. One skilled in the art shall also recognize that a combined system may perform both training and classifying by including with the common components a training module (e.g., contextual boost classifier trainer 1140) and a detector (e.g., contextual boost classifier 1240) and a switch or selector, such as a mechanical or software-implemented switch, to switch or select between the two modes. Because similar components to the training system 1105 may function in like or similar manner for the detector system 1205, for purposes of brevity, the operations of those components are provided summarily below.

In embodiments, the system comprises a preprocess 1110, which may be optional, that receives one or more input images 1250 and performs steps that aid in efficient processing as previously discussed above. In embodiments, image patches may be obtained from one or more input images 1250 using an existing detector or detectors, such as AdaBoost or SVM. In embodiments, the confidence value(s) of the initial detector may be set so that the detected images are over-inclusive, thereby reducing the possibility of excluding true image patches in the initial detection. As result of being over-inclusive, a large number of false positives will be included; however, the subsequent detection can assist in eliminating these false positives. In embodiments, the image patches may be all or some subset of the scan windows from an input image. It shall be noted that the image patches may be in the form of locations in an image.

In embodiments, the preprocessor may be part of the image context processor 1115, or alternatively, the functions of the preprocessor may be performed by the image context processor 1115.

In embodiments, the image context processor 1115 receives the preprocessed data from the preprocessor 1110 to extract features and generate classifier response values for the extracted features, as previously discussed. In embodiments, the image context extractor 1120 may be as described with respect to FIG. 13, although other configurations may be used.

In embodiments, the contextual boost processor 1230 receives the image scan windows and classifier response values and uses this information to generate detection results 1260. In embodiments, the contextual boost processor 1230 function similar to the contextual boost processor 1130 of the training system; however, the contextual boost processor 1230 comprises a contextual boost classifier 1240 that apples the pre-trained set of contextual boost classifiers to the augmented features sets to obtain response values for the image windows. In embodiments, the contextual boost processor 1230 may output the values. Alternatively, the contextual boost processor 1230 may compare the values to a threshold or thresholds to assign detection labels regarding whether or not the image window contains the object of interest and may output the labels. Thus, in embodiments, when a maximum iteration is reached, thresholding on the final classifier responses followed by non-maximal suppression identifies the objects.

Figure 14:
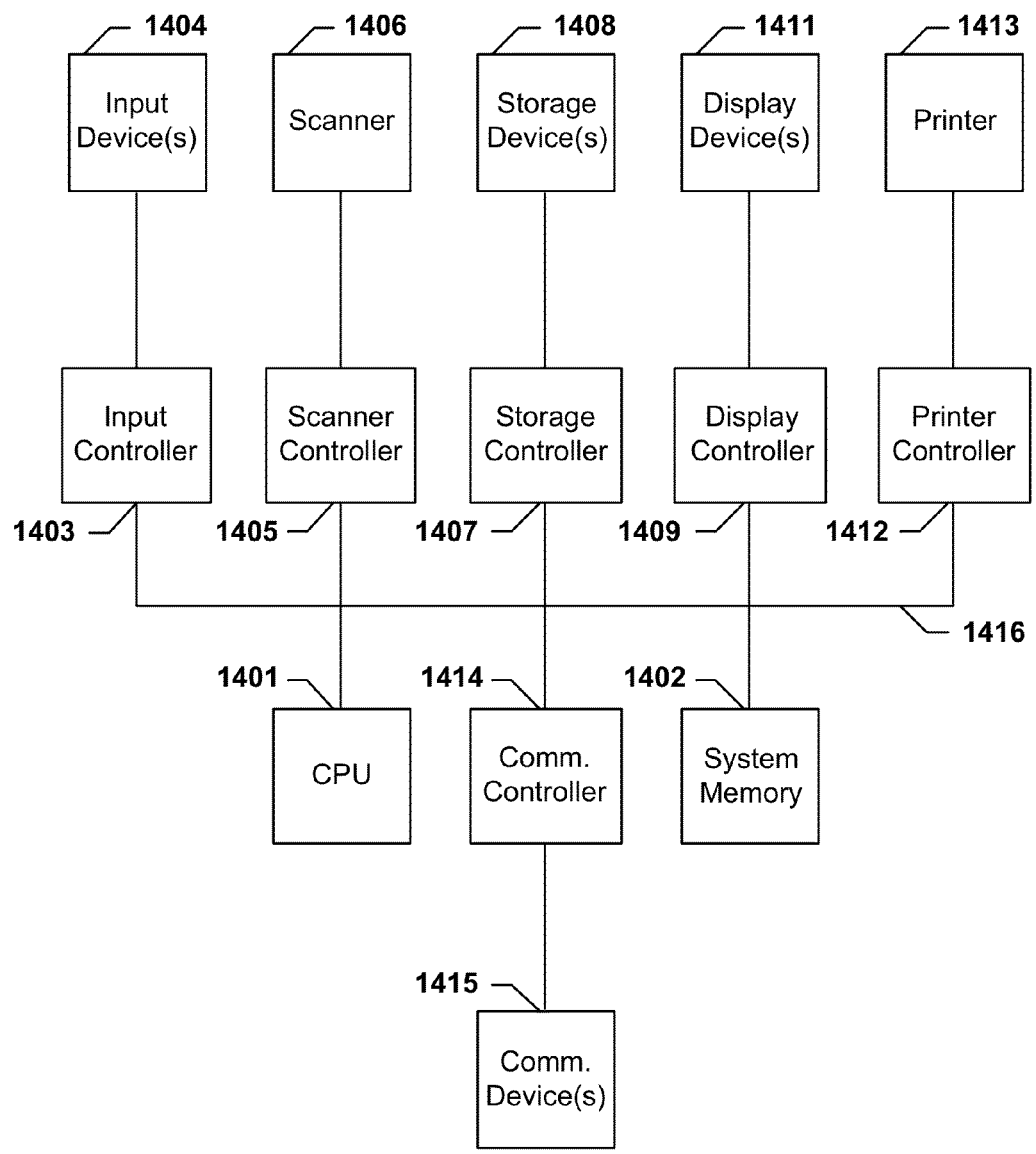
FIG. 14 is a block diagram illustrating an exemplary system which may be used to implement aspects of the present invention.

Having described the details of the invention, an exemplary system 1400, which may be used to implement one or more aspects of the present invention, will now be described with reference to FIG. 14. As illustrated in FIG. 14, the system includes a central processing unit (CPU) 1401 that provides computing resources and controls the computer. The CPU 1401 may be implemented with a microprocessor or the like, and may also include a graphics processor and/or a floating point coprocessor for mathematical computations. The system 1400 may also include system memory 1402, which may be in the form of random-access memory (RAM) and read-only memory (ROM).

A number of controllers and peripheral devices may also be provided, as shown in FIG. 14. An input controller 1403 represents an interface to various input device(s) 1404, such as a keyboard, mouse, or stylus. There may also be a scanner controller 1405, which communicates with a scanner 1406. The system 1400 may also include a storage controller 1407 for interfacing with one or more storage devices 1408 each of which includes a storage medium such as magnetic tape or disk, or an optical medium that might be used to record programs of instructions for operating systems, utilities and applications which may include embodiments of programs that implement various aspects of the present invention. Storage device(s) 1408 may also be used to store processed data or data to be processed in accordance with the invention. The system 1400 may also include a display controller 1409 for providing an interface to a display device 1411, which may be a cathode ray tube (CRT), a thin film transistor (TFT) display, or other type of display. The system 1400 may also include a printer controller 1412 for communicating with a printer 1413. A communications controller 1414 may interface with one or more communication devices 1415, which enables the system 1400 to connect to remote devices through any of a variety of networks including the Internet, a local area network (LAN), a wide area network (WAN), or through any suitable electromagnetic carrier signals including infrared signals.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

Embodiments of the present invention may be encoded upon one or more non-transitory computer-readable media with instructions for one or more processors or processing units to cause steps to be performed. It shall be noted that alternative implementations are possible, including a hardware implementation or a software/hardware implementation. Hardware-implemented functions may be realized using ASIC(s), programmable arrays, digital signal processing circuitry, or the like. Accordingly, the term "computer-readable medium or media" as used herein embraces software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

Results—Overview

Results are presented herein to demonstrate possession of the invention aspects presented in the current document. These results were performed using specific embodiments and under specific conditions; accordingly, nothing in these results sections shall be used to limit the inventions of the present patent document. Rather, the inventions of the present patent document shall embrace all alternatives, modifications, applications and variations as may fall within the spirit and scope of the appended claims.

Embodiments of the detection methods were tested on a benchmark database and using an adopt per-image evaluation methodology as has been suggested in the art. Detection rates were compared using False-Positive-Per-Image (FPPI) curves. First, to demonstrate the advantage of embodiments that of the image context features that include all four multi-scale HOGs and LDP features, the detection performance with each of the four HOGs, three types of combinations of the HOGs, and the LDP features were compared. Second, to analyze and evaluate the contextual boost classification, the effect of different parameter settings on combining the classification context cues in the spatial and scale spaces is shown. Finally to confirm the improvement on the overall detection accuracy by contextual boost, embodiments of the contextual boost methodology were compared with other approaches based on benchmark results. The runtime efficiency is also presented and discussed.

The evaluation scenario "call" as has been suggested in the art (e.g., train using "S0-S5" and test on "S6-S10") was adopted. Specifically, four thousand images were randomly selected from S0-S5 for training, and four thousand images were randomly selected from "S6-S10" for testing. To generate positive training samples, we considered the image regions labeled as "persons" that are un-occluded and greater than 50 pixels high. Totally 2594 of such regions together with their context neighborhood were selected as positive samples. Similarly around 42,000 negative samples were chosen at random locations and sizes in the training images without humans.

Results—Image Context Features

Figure 15:
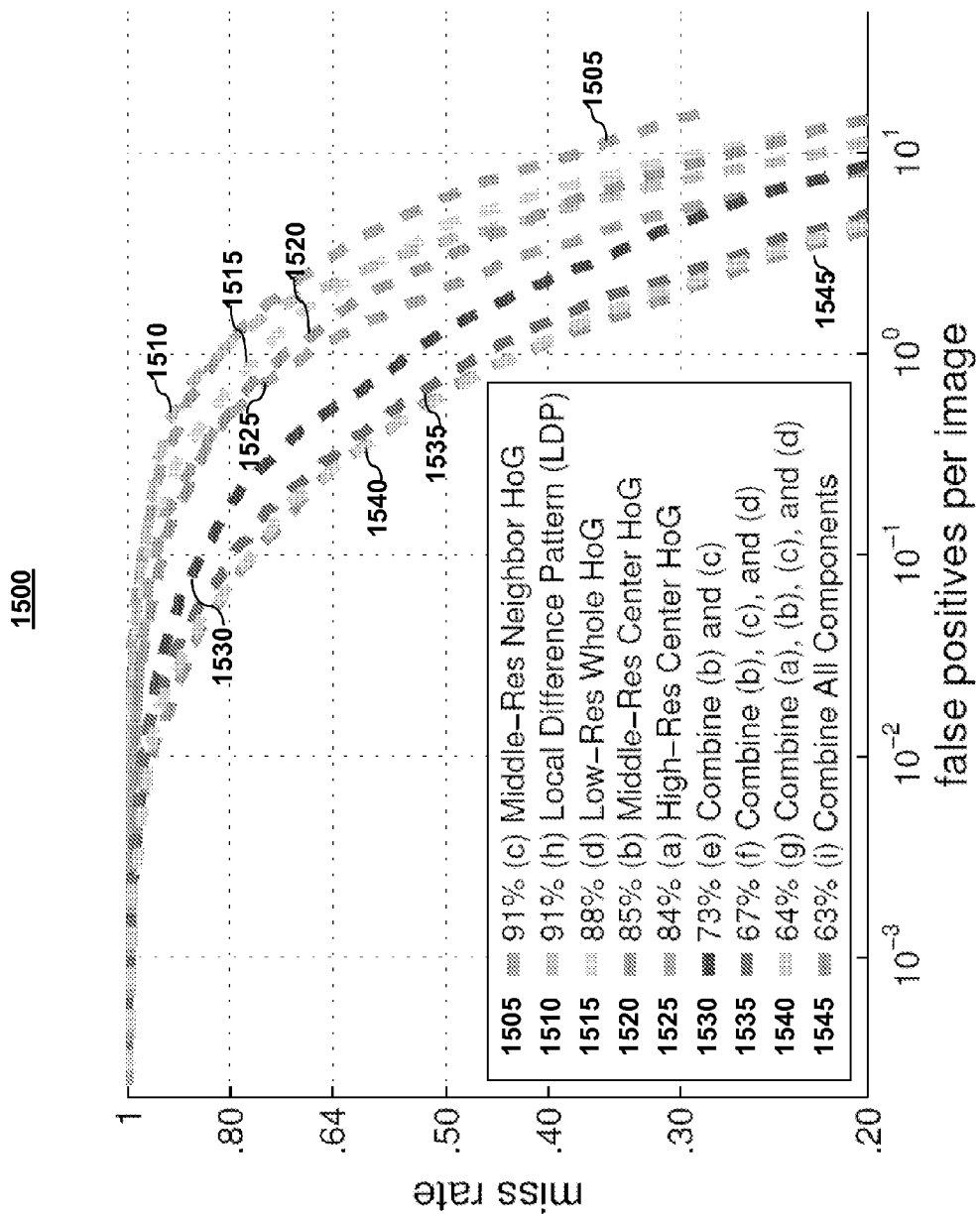
FIG. 15 depicts results of experiments using embodiments image-context-feature-based Adaboost classifiers according to embodiments of the present invention.

The effectiveness of embodiments of image context features comprising the multi-scale HOGs and LDP features as described in above was evaluated. Among the four HOGs, two were extracted inside the scan window at high and middle scales without considering the context. The other components in the image context incorporate the context cues in spatial, shape, scale, and color spaces respectively. To illustrate the advantage of combining the local features and all the image context cues in embodiments, its detection rate (=1−miss rate) was compared with embodiments of the individual HOG and LDP features. As shown in FIG. 15, while the individual features alone did not perform remarkably well, with the best log-average miss rate of 84% by the high-resolution local HOG feature, combining all of them results in great improvement and reduces the log-average miss rate to 63%. To show that all individual HOGs and LDP features help improve the detection accuracy, the image context features with three different combinations of the four HOGs without using the LDP features were compared. The three combinations include only two, three, or all four of the HOG features respectively. As shown in FIG. 15, the log-average miss rate decreases in general when more HOG features were included.

As shown in FIG. 15, the best rate of a single HOG was 84%. It is reduced to 73% using two HOGs, 67% with three HOGs, and 64% with all four HOGs. Including the LDP into the final image context features, it is further reduced to 63%. The later improvements are less significant since higher accuracy is more difficult to further improve. This indicates that all these features are effective and may be used together for improved detection.

In experiments, an embodiment of the high-scale HOG was computed at resolution 32×64 and embodiments of the middle and low scale HOGs were both at 16×32. Note that the embodiment of the low-scale HOG covered the whole context region and the embodiment of the middle-scale HOG did not. In this experiment, the cell and block sizes for all scales of HOGs were identical at 4×4 and 8×8. For the embodiment of the LDP features, resolution of 32×64 and block size of 4×4 were used. The classifiers were all constructed using the Adaboost algorithm, which is well known to those of skill in the art.

Results—Image Context Features

Figure 16:
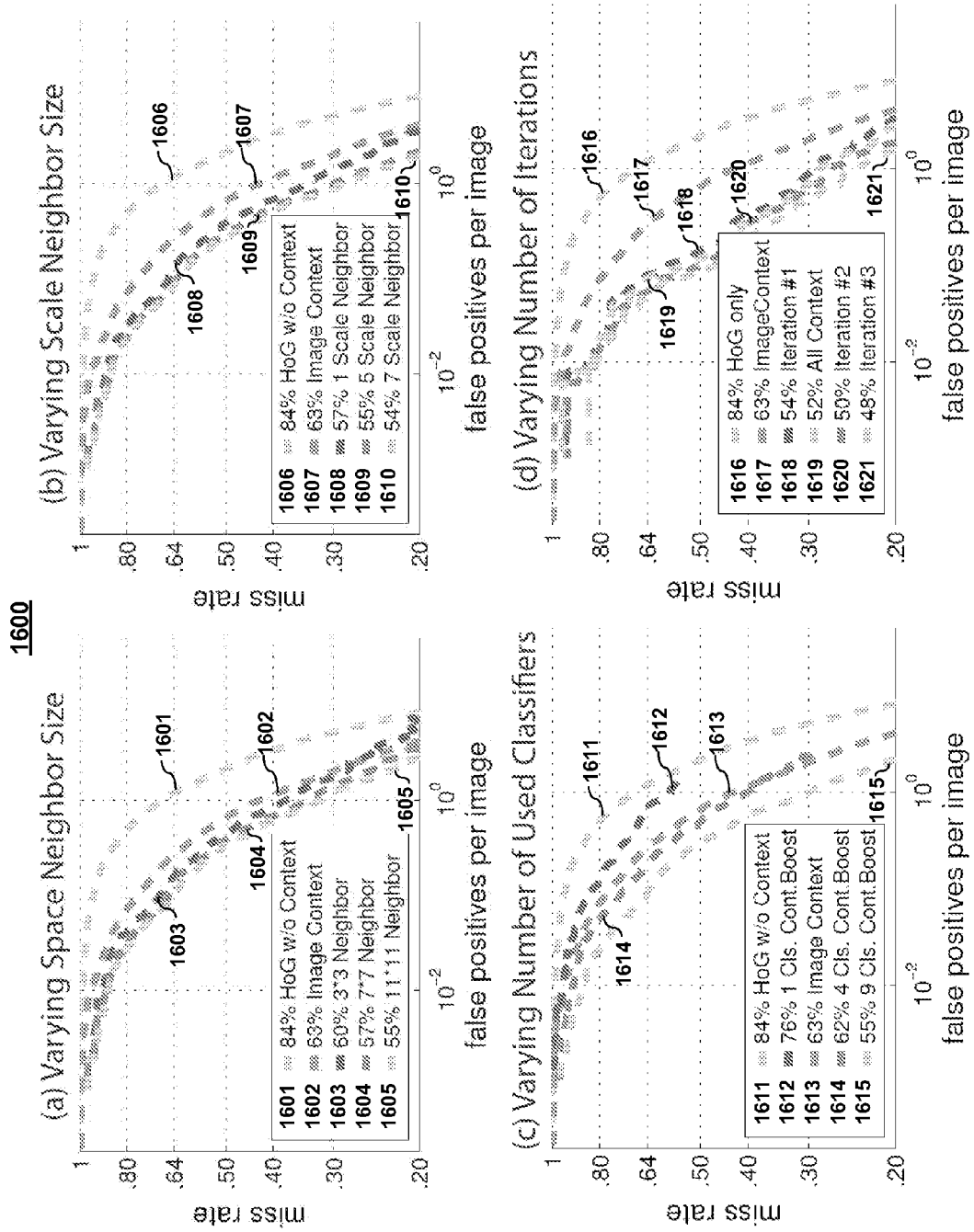
FIGS. 16(a)-(d) depict results of experiments on embodiments of the contextual boost using different parameters according to embodiments of the present invention.

Embodiments of the contextual boost classification methodology based on the methods in Table 1 and Table 2 were also evaluated. In the classification step, a few parameters determine how much classification context in the spatial and scale space may be incorporated, including size of the spatial context region ($s_x$, $s_y$), size of the scale context range ($s_w$), number of image feature classifiers (M), and number of iterations (R). The M classifiers were chosen from 9 different combinations of image context features, as shown in FIG. 15. Different settings on these parameters were tested to show their effects. FIG. 16(*a*) shows the contextual boost results using three different spatial context sizes, 3×3 ($s_x=s_y=1$), 7×7, and 11×11, respectively. In this test $s_w=0$ (no scale context), M=9, and R=1. The results by local HOG feature alone and image context features were also included as baseline. Even with only 3×3 neighborhood, the contextual boost outperformed the baseline methods and reduced the log-average miss rate to 60%. The performance further improved when the spatial context coverage grew, and reached the log-average miss rate of 55% with 11×11 neighborhood.

FIG. 16(b) shows the results using three different sizes on scale context, respectively $s_w=0$ (no scale context), 2 (5 scales), and 3 (7 scales). In this test $s_x=s_y=3$ (7×7), M=9, and R=1. Without using the scale context, the contextual boost enforcing spatial context constraints already outperformed the baseline methods and achieved the log-average miss rate of 57%. When more scale context was used together, the detection accuracy further increased. The log-average miss rate was reduced to 54% when 7 scales were used.

FIG. 16(c) shows the results of three different sets of image context based classifiers, respectively one local HOG alone, four individual multi-scale HOGs, and all nine classifiers in FIG. 15. In this test $s_x=s_y=5$ (11×11), $s_w=2$ (5 scales), and R=1. The contextual boost with local HOG features achieved better accuracy than the initial local HOG classifier, but worse than the classifier based on the image context features of the present invention before contextual boost. This indicates that feature effectiveness is an independent factor to the success of the classification algorithm. On the other hand, when four individual multi-scale HOG-based classifiers were used in the contextual boost, it outperformed the image context-based classifier. This indicates that the advantage of classification algorithm can overcome the weakness of the features to some extent. When all nine classifiers were used, the log-average miss rate was reduced from 62% (4 classifiers used) to 55%. Note that the methods of the present patent document allow easy incorporation of other effective human classifiers, which may further reduce the error.

In the experiments, the contextual boost algorithm generally converged within three iterations. FIG. 16(d) shows the contextual boost results at iteration 1, 2, and 3 respectively, where $s_x=s_y=3$, $s_w=3$ (7 scales), and M=9. At iteration 1, the embodiment of the contextual boost achieved the log-average miss rate of 54%. The rate was reduced to 50% at iteration 2 and further reached 48% at iteration 3. These experiments confirm that the performance of embodiments of the contextual boost improve when bigger spatial and scale neighborhood, more image context classifiers, and more iterations were applied. The best accuracy of the tested embodiments of the contextual boost achieved combining spatial and scale context cues was 48% log-average miss rate.

Also tried was a single iteration using all context features with bigger neighbor sizes $s_x=s_y=s_w=9$ that contains the same effective neighbors as that of three iterations with $s_x=s_y=s_w=3$. FIG. 16(d) shows this setting achieved log-average miss rate of 52%. Compared with the $s_x=s_y=s_w=3$, it was slightly better than the first iteration but worse than the third iteration. This indicates the iterative nature of the contextual boosting scheme better exploits the context cues.

Results—Overall Detection Performance

Figure 17:
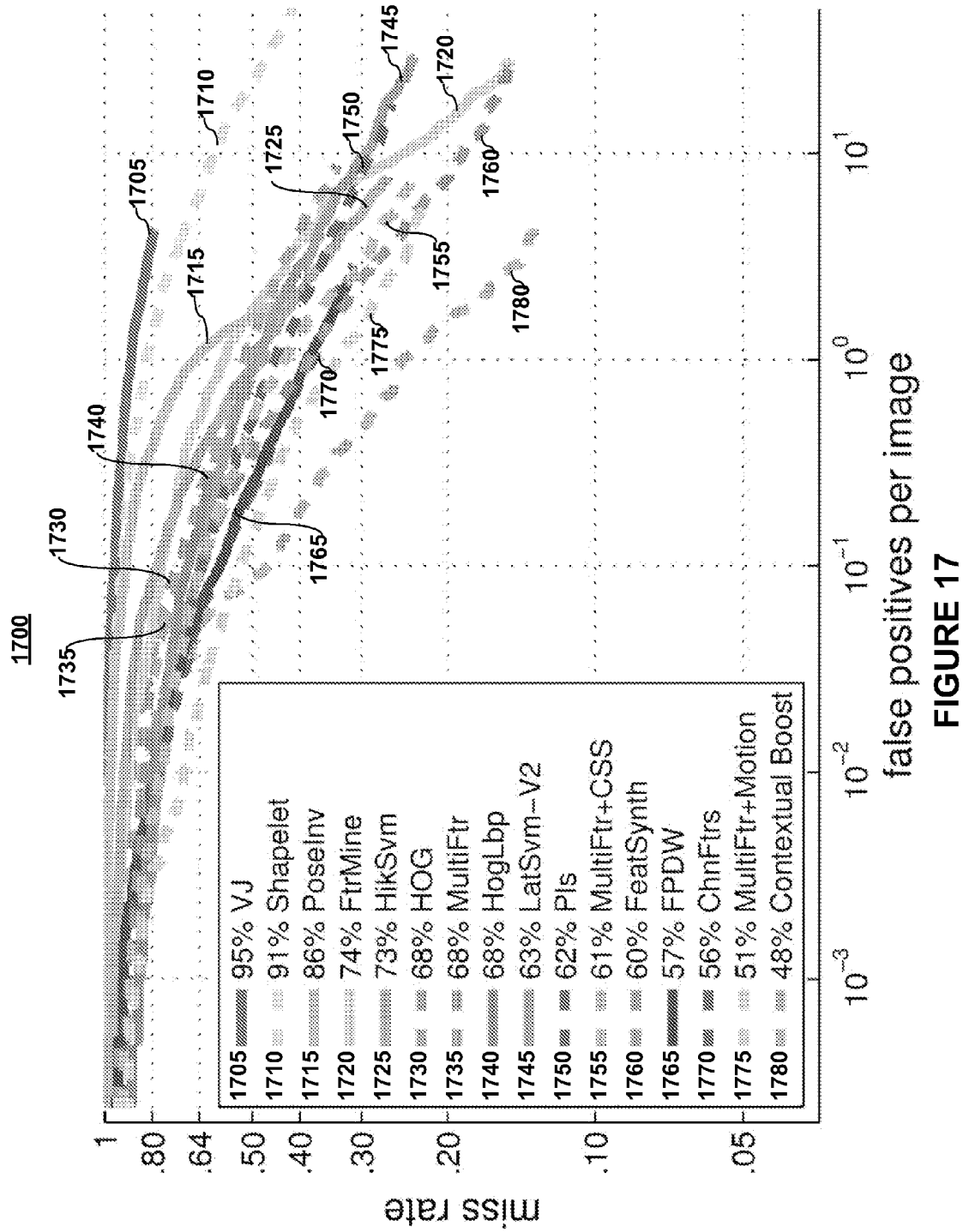
FIG. 17 depict results of experiments on an embodiment of the contextual boost relative to other methods according to embodiments of the present invention.

Finally, the overall detection performance of an embodiment of the contextual boost was compared with six of the state-of-art approaches: (1) the Viola-Jones object detection framework (see, e.g., P. Viola and M. Jones, "Robust real-time object detection," International Journal of Computer Vision (IJCV), 2002); (2) Shapelet (see, e.g., P. Sabzmeydani and G. Mori, "Detecting pedestrians by learning shapelet features," IEEE Computer Vision and Pattern Recognition (CVPR), 2007); (3) Feature Mining (FtrMine) (see, e.g., P. Dollar, Z. Tu, H. Tao, and S. Belongie, "Feature mining for image classification," IEEE Computer Vision and Pattern Recognition (CVPR), 2007); (4) LatSVM-V2 (see, e.g., P. Felzenszwalb, R. Girshick, and D. McAllester, "Cascade Object Detection with Deformable Part Models," In Proceedings of the IEEE Computer Vision and Pattern Recognition (CVPR) 2010); (5) Histogram Intersection Kernel and Support Vector Machine (HikSVM) (see, e.g., S. Maji, A. C. Berg, and J. Malik, "Classification using intersection kernel support vector machines is efficient," IEEE Computer Vision and Pattern Recognition (CVPR), 2008); (6) Histogram of Oriented Gradients (HOG) (see, e.g., N. Dalal, B. Triggs, "Histograms of oriented gradients for human detection," IEEE Computer Vision and Pattern Recognition (CVPR), page 1:886-893, 2005); (7) MultiFtr+CCS (see, e.g., S. Walk, N. Majer, K. Schindler, and B. Schiele, "New features and insights for pedestrian detection," IEEE Computer Vision and Pattern Recognition (CVPR), pages 1030-1037, 2010); (8) MultiFtr+Motion (see, e.g., S. Walk, N. Majer, K. Schindler, and B. Schiele, "New features and insights for pedestrian detection," IEEE Computer Vision and Pattern Recognition (CVPR), pages 1030-1037, 2010); (9) Channel Features (ChnFtrs) (see, e.g., P. Dollár, Z. Tu, P. Perona, and S. Belongie, "Integral channel features," in British Machine Vision Conference (BMVC), 2009); (10) MultiFtr (see, e.g., C. Wojek and B. Schiele, "A performance evaluation of single and multi-feature people detection," in Proceedings of the 30th DAGM symposium on Pattern Recognition, pages 82-91, 2008); (11) Histogram of Oriented Gradient-Local Binary Pattern (HogLbp) (see, e.g., X. Wang, T. X. Han, and S. Yan, "An HOG-LBP human detector with partial occlusion handling," in Proceedings of International Conference on Computer Vision (ICCV), pages 32-39, 2009); (12) FPDW (see, e.g., P. Dollár, S. Belongie, and P. Perona, "The fastest pedestrian detector in the west," in British Machine Vision Conference (BMVC), 2001); (13) FeatSynth (see, e.g., A. Bar-Hillel, D. Levi, E. Krupka, and C. Goldberg, "Part-based feature synthesis for human detection," in European Conference on Computer Vision (ECCV), pages 127-142, 2010); and (14) PosInv (see, e.g., Z. Lin and L. S. Davis, "A pose-invariant descriptor for human detection and segmentation," in European Conference on Computer Vision (ECCV), pages 423-436, 2008). The results of these methods were regenerated using the code provided by P. Dollár, C. Wojek, B. Schiele, and P. Perona in "Pedestrian detection: An evaluation of the state of the art," IEEE Transactions on Pattern Analysis and Machine Intelligence (TPAMI), 2011. Each of the above-referenced items is incorporated herein by reference in its entirety. In the experiments, only unoccluded human with minimum height of 50 pixels were considered. FIG. 17 depict results of experiments on an embodiment of the contextual boost relative to other methods according to embodiments of the present invention. As shown in FIG. 17, the best log-average miss rate of the existing single image based methods was 56% by ChnFtrs 1770, while the tested embodiment of contextual boost 1780 decreases to 48%. This result is even better than 51% by MultiFtr+Motion 1775 that combined image features and motion information. If we consider the miss rate at 1 false positive per image (FPPI), the best of the existing methods was 29% by the method discussed in D. Park, D. Ramanan, and C. Fowlkes, "Multiresolution models for object detection," in European Conference on Computer Vision (ECCV), 2010 (which is incorporated by reference herein in its entirety), while an embodiment of the contextual boost decreased to 25%. Thus, it can be seen that contextual boost better localized the pedestrians and yet greatly reduced the false detections.

It shall be noted that experiments were non-optimized implementations tested on a Intel i7 CPU with 16G RAM. For 640×480 images scanned at 48 scales with minimal window width of 25 pixels, it ran at ~10 seconds per image. Compared to the single local HOG-based method, the overall execution time only increases ~15%. This confirms that, while incorporating more cues, the contextual booth methodology does not require much extra computational cost. Further increase in speed may be obtained by methods such as cascaded classifiers.

While the inventions have been described in conjunction with several specific embodiments, it is evident to those skilled in the art that many further alternatives, modifications, and variations will be apparent in light of the foregoing description. Thus, the inventions described herein are intended to embrace all such alternatives, modifications, applications and variations as may fall within the spirit and scope of the appended claims.

What is claimed is:

1. A non-transitory computer-readable medium or media comprising one or more sequences of instructions which, when executed by one or more processors, causes steps to be performed comprising:
   obtaining a set of image features for a local image window and for a set of neighboring image windows;
   applying a set of classifiers corresponding to the set of image features to obtain a set of classifier response values for the local image window and the set of neighboring image windows;
   generating a classification context feature set for the local image window comprising the set of classifier response values for the local image window and the set of neighborhood image windows;
   constructing a contextual boost feature set comprising the classification context feature set and the set of image features for the local image window and for the set of neighboring image windows; and
   augmenting the contextual boost feature set by iteratively adding an updated classification context feature set to the contextual boost feature set of an immediately prior iteration until a stop condition is reached.

2. The non-transitory computer-readable medium or media of claim 1 wherein the set of neighboring image windows comprises image windows that neighbor the local image window in a plurality of parameters.

3. The non-transitory computer-readable medium or media of claim 1 wherein augmenting the contextual boost feature set by iteratively adding an updated classification context feature set to the contextual boost feature set of an immediately prior iteration until a stop condition is reached comprises:
   [a] selecting a trained contextual boost classifier from a set of trained contextual boost classifiers;
   [b] applying the selected trained contextual boost classifier to the contextual boost feature set to obtain a contextual boost classifier response value;
   [c] responsive to the stop condition not being reached:
      replacing the set of image classifier response values with the contextual boost classifier response value;
      using the replaced set of image classifier response values to obtain the updated classification context feature set;
      adding the updated classification context feature set to the contextual boost feature set;
      selecting a next trained contextual boost classifier from the set of trained contextual boost classifier, the next trained contextual boost classifier being one that has not been previously selected; and
      returning to step [b]; and
   [d] responsive to the stop condition being reached, outputting the contextual boost classifier response value for the local image window.

4. The non-transitory computer-readable medium or media of claim 3 wherein the stop condition occurs when each of the trained contextual boost classifiers in the set of trained contextual boost classifiers has been applied.

5. The non-transitory computer-readable medium or media of claim 4 wherein the trained contextual boost classifiers in the set of trained contextual boost classifiers are ordered in the set based upon training which obtained the set of trained contextual boost classifiers and the step of selecting a next trained contextual boost classifier from the set of trained contextual boost classifier comprises selecting the next trained contextual boost classifier according to the ordering in the set.

6. The non-transitory computer-readable medium or media of claim 4 further comprising:
   comparing the contextual boost classifier response value to a threshold to indicate whether an object of interest was detected in the local image window.

7. The non-transitory computer-readable medium or media of claim 1 wherein obtaining a set of image features for a local image window and for a set of neighboring image windows comprises, for each image window of the local image window and of the set of neighboring image windows:
   generating a context region for the image window comprising at least a portion of the image and formed by selecting a portion or portions of the image that are within a context region area defined relative to the image window;
   constructing a multi-scale feature comprising:
      a high-scale feature comprising one or more features extracted from the image window at a high-resolution size;
      a mid-scale feature comprising a combination of one or more features extracted from the image window at a mid-resolution and one or more features extracted from a set of one or more regions at the mid-resolution, the set of one or more regions being formed from the context region; and
      a low-scale feature comprising one or more features extracted from a combined image window at a low-resolution size, the combined image window comprising the image window and the context region related to the image window.

8. The non-transitory computer-readable medium or media of claim 7 wherein:
   responsive to a portion of the context region being outside a boundary of the image, filling the portion of the context region that is outside the boundary of the image with one or more values.

9. The non-transitory computer-readable medium or media of claim 7 further comprising, for each image window of the local image window and of the set of neighboring image windows:
   computing a local difference pattern feature by performing the steps comprising:
      partitioning the context region and the image window into blocks;
      calculating a brightness value for a reference portion;
      calculating a brightness value for at least some of the blocks;
      computing a difference value between the brightness of the reference portion and the brightness of at least some of the blocks; and
      forming the difference values into the local difference pattern feature.

10. A non-transitory computer-readable medium or media comprising one or more sequences of instructions which, when executed by one or more processors, causes steps to be performed, the steps comprising:

defining a set of neighboring image windows in a neighborhood region for an image window, the neighboring region comprising at least spatial and scale dimensions;

extracting one or more image features for the image window and for each image window in the set of neighboring image windows;

obtaining classifier response values for the extracted image features of the image window and the set of neighboring image windows; and generating, for the image window, a classification context feature comprising the classifier response values for the image window and the classifier response values for the set of neighboring image windows.

11. The non-transitory computer-readable medium or media of claim 10 further comprising:

generating a contextual boost feature for the image window comprising the one or more image features extracted from the image window and from the set of neighboring image windows and the classification context feature.

12. The non-transitory computer-readable medium or media of claim 11 further comprising:

augmenting the contextual boost feature for the image window by iteratively adding an updated classification context feature to the contextual boost feature of an immediately prior iteration until a stop condition has been reached.

13. The non-transitory computer-readable medium or media of claim 12 wherein augmenting the contextual boost feature for the image window by iteratively adding an updated classification context feature to the contextual boost feature set of an immediately prior iteration until a stop condition has been reached comprises:

[a] selecting a trained contextual boost classifier from a set of trained contextual boost classifiers;

[b] applying the selected trained contextual boost classifier to the contextual boost feature set to obtain a contextual boost classifier response value;

[c] responsive to the stop condition not being reached:

replacing the set of image classifier response values with the contextual boost classifier response value;

using the replaced set of image classifier response values to obtain the updated classification context feature set;

adding the updated classification context feature set to the contextual boost feature set;

selecting a next trained contextual boost classifier from the set of trained contextual boost classifier, the next trained contextual boost classifier being one that has not been previously selected; and returning to step [b]; and

[d] responsive to the stop condition being reached, outputting the contextual boost classifier response value for the image window.

14. The non-transitory computer-readable medium or media of claim 10 wherein the step of extracting one or more image features for the image window and for each image window in the set of neighboring image windows comprises:

generating a multi-scale feature set and a local different pattern feature set for each image window.

15. The non-transitory computer-readable medium or media of claim 14 wherein the step of generating a local different pattern feature set comprises:

generating a context region for the image window comprising at least a portion of the image and formed by selecting a portion or portions of the image that are within a context region area defined relative to the image window;

computing a local difference pattern feature by performing the steps comprising:

partitioning the context region and the image window into blocks;

calculating a brightness value for a reference block;

calculating a brightness value for at least some of the blocks;

computing a difference value between the brightness of the reference block and the brightness of at least some of the blocks; and forming the difference values into the local difference pattern feature.

16. The non-transitory computer-readable medium or media of claim 14 wherein the step of generating multi-scale feature set comprises:

generating a context region for the image window comprising at least a portion of the image and formed by selecting a portion or portions of the image that are within a context region area defined relative to the image window; and constructing a multi-scale feature comprising:

a high-scale feature comprising one or more features extracted from the image window at a high-resolution size;

a mid-scale feature comprising a combination of one or more features extracted from the image window at a mid-resolution and one or more features extracted from a set of one or more regions at the mid-resolution, the set of one or more regions being formed from the context region; and a low-scale feature comprising one or more features extracted from a combined image window at a low-resolution size, the combined image window comprising the image window and the context region related to the image window.

17. A processor-based system for classifying an object in an image, the system comprising:

one or more processors; and a non-transitory computer-readable medium or media comprising one or more sequences of instructions which, when executed by the one or more processors, causes steps to be performed comprising:

for each local window of a set of local windows from the image:

[a] computing a set of image features;

[b] applying one or more pre-trained classifiers to the set of image features to obtain a set of classifier response values;

[c] generating a classification context for the local window using the set of classifier response values of the local window and the sets of classifier response values of local windows that are within a neighborhood of the local window; and

[d] constructing an augmented feature set comprising the classification context and the set of image features for the local window;

[e] applying a pre-trained contextual boost classifier to the augmented feature set to obtain a set of contextual boost classifier response values;

[f] responsive to a stop condition not being reached:

adjusting the classification context for the local window using the set of contextual boost classifier response values;

adjusting the augmented feature set for the local window using the classification context and a prior augmented feature set for the local window; and returning to [e].

18. The processor-based system for classifying an object in an image of claim 17 wherein the step of computing a set of image features comprises:
- generating a context region for the local window comprising at least a portion of the image and formed by selecting a portion or portions of the image that are within a context region area defined relative to the local window;
- computing a local difference pattern feature by performing the steps comprising:
  - partitioning the context region and the local window into blocks;
  - calculating a brightness value for a reference block;
  - calculating a brightness value for at least some of the blocks;
  - computing a difference value between the brightness of the reference block and the brightness of at least some of the blocks; and
  - forming the difference values into the local difference pattern feature; and
- constructing a multi-scale feature comprising:
  - a high-scale feature comprising one or more features extracted from the local window at a high-resolution size;
  - a mid-scale feature comprising a combination of one or more features extracted from the local window at a mid-resolution and one or more features extracted from a set of one or more regions at the mid-resolution, the set of one or more regions being formed from the context region; and
  - a low-scale feature comprising one or more features extracted from a combined local window at a low-resolution size, the combined local window comprising the local window and the context region for the local window.

19. The processor-based system for classifying an object in an image of claim 17 wherein the neighborhood spans a plurality of parameters.

20. The processor-based system for classifying an object in an image of claim 17 further comprising:
- responsive to the stop condition being reached, comparing the set of contextual boost classifier response values to a threshold to decide whether the object was detected in the local windows.

* * * * *